US012757072B2

(12) United States Patent
Cogalan et al.

(10) Patent No.: US 12,757,072 B2
(45) Date of Patent: Oct. 6, 2026

(54) METHODS AND APPARATUS FOR ANALYTICS-BASED USER PLANE OPTIMIZATION

(71) Applicant: InterDigital Patent Holdings, Inc., Wilmington, DE (US)

(72) Inventors: Tezcan Cogalan, London (GB); Morteza Kheirkhah, London (GB); Alain Mourad, Ascot (GB); Ulises Olvera-Hernandez, Saint-Lazare (CA); Saad Ahmad, Montreal (CA); Michael Starsinic, Newtown, PA (US); Guanzhou Wang, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 81 days.

(21) Appl. No.: 18/850,397

(22) PCT Filed: Mar. 28, 2023

(86) PCT No.: PCT/US2023/016627

§ 371 (c)(1),
(2) Date: Sep. 24, 2024

(87) PCT Pub. No.: WO2023/192322

PCT Pub. Date: Oct. 5, 2023

(65) Prior Publication Data

US 2025/0212061 A1 Jun. 26, 2025

Related U.S. Application Data

(60) Provisional application No. 63/324,457, filed on Mar. 28, 2022.

(51) Int. Cl.
*H04W 28/086* (2023.01)

(52) U.S. Cl.
CPC .............................. *H04W 28/0865* (2023.05)

(58) Field of Classification Search
CPC .......................... H04W 28/0865; H04W 24/02
See application file for complete search history.

(56) References Cited

U.S. PATENT DOCUMENTS 10,936,955 B1 * 3/2021 Muralidharan ....... H04L 67/535
11,544,598 B1 * 1/2023 Lin ........................ G06N 20/00
(Continued)

FOREIGN PATENT DOCUMENTS

AU 2014262185 A1 * 11/2014
EP 3890257 A1 * 10/2021 ............. H04L 49/30
(Continued)

OTHER PUBLICATIONS

3rd Generation Partnership Project; Technical Specification Group Services and System Aspects; Study on Access Traffic Steering, Switching and Splitting support in the 5G system architecture (Release 16), 3GPP TR 23.793 V2.0.0 (Dec. 2018), 116 pages.
(Continued)

*Primary Examiner* — Kyung H Shin
(74) *Attorney, Agent, or Firm* — Jamie T. Nguyen

(57) ABSTRACT

Procedures, methods, architectures, apparatuses, systems, devices, and computer program products directed to analytics-based user plane optimization are provided. A first network entity (NE) may receive, from a second NE, information indicating analytics based operation for access traffic steering, splitting and switching (ATSSS), and first weights and a first weighting factors for multiple access networks; transmit, to a third NE, information indicating the analytics based operation, including the first weights and weighting factors; transmit, to a fourth NE, information indicating load metrics; receive, from the fourth NE, information indicating analytics for controlling traffic steering for a multi-access
(Continued)

protocol data unit session, including second weights and/or second weighting factors for the multiple access networks, wherein the analytics are based on the load metrics and criteria for partitioning downlink traffic among the multiple access networks; and transmit, to the third NE, information indicating the second weights and/or second weighting factors.

20 Claims, 14 Drawing Sheets

(56) References Cited

U.S. PATENT DOCUMENTS

| | | | | |
|---|---|---|---|---|
| 2013/0121145 A1* | 5/2013 | Draznin | H04W 48/18 370/230 |
| 2016/0066222 A1* | 3/2016 | Makinen | H04W 74/002 370/331 |
| 2019/0104040 A1* | 4/2019 | Sharma | H04L 41/0806 |
| 2021/0083956 A1 | 3/2021 | Fan et al. | |
| 2021/0345158 A1 | 11/2021 | Puente et al. | |
| 2022/0408293 A1* | 12/2022 | Han | H04W 8/24 |

FOREIGN PATENT DOCUMENTS

| | | | |
|---|---|---|---|
| WO | WO 2021155090 A1 | 8/2021 | |
| WO | WO-2022026482 A1 * | 2/2022 | H04W 24/02 |

OTHER PUBLICATIONS

3rd Generation Partnership Project; Technical Specification Group Services and System Aspects; System architecture for the 5G System (SGS); Stage 2 (Release 17), 3GPP TS 23.501 V17 .4.0 (Mar. 2022), 568 pages.
OPPO, Samsung; New SID on 5G System Support for AI/ML-based Services', Tdoc SP-211328, TSG SA Meeting #SP-94E, Dec. 14-20, 2021, Electronic meeting.
T. P. Lillicrap, et al., "Continuous control with deep reinforcement learning," arXiv preprint arXiv:1509.02971, 2015.
3rd Generation Partnership Project; Technical Specification Group Services and System Aspects; Study on traffic characteristics and performance requirements for AI/ML model transfer in 5GS (Release 18), 3GPP TR 22.874 V18.2.0, Dec. 2021, 110 pages.
3rd Generation Partnership Project; Technical Specification Group Services and System Aspects; Study on enablers for network automation for the5G System (5GS); Phase 2(Release 17); 3GPP TR 23.700-91 V17.0.0, Dec. 2020.
Third Generation Partnership Project, "Technical Specification Group Services and System Aspects; Study on access traffic steering, switch and splitting support in the 5G system architecture (Release 16)," 3GPP TR 23.793 V16.0.0 (Dec. 2018).
Ericsson et al., "New SID: Study on enhanced support of Non-Public Networks phase 2", Tdoc SP-211568, TSG SA Meeting #SP-94E, Dec. 14-20, 2021, Electronic meeting.
Third Generation Partnership Project, "Technical Specification Group Services and System Aspects; Architecture enhancements for 5G System (SGS) to support network data analytics services (Release 19)," 3GPP TS 23.288 V19.2.0 (Mar. 2025).
3rd Generation Partnership Project; Technical Specification Group Services and System Aspects; System architecture for the 5G System (SGS); Stage 2 (Release 17), 3GPP TS 23.501 V17.4.0 (Mar. 2022), 568 pages (Part 1 and 2).
3rd Generation Partnership Project; Technical Specification Group Services and System Aspects; Study on access traffic steering, switch and splitting support in the 5G System (5GS) achitecture; Phase 2; (Release 17); 3GPP TR 23.700-93 V17.0.0, Mar. 2021.
Lenovo, et al., "New SID on Access Traffic Steering, Switching and Splitting support in the 5G system architecture; Phase 3", Tdoc SP-211612, TSG SA Meeting #SP-94E, Dec. 14-20, 2021, 6 pages.
China Mobile, Vivo; "Study on Enablers for Network Automation for 5G—phase 3", Tdoc SP-211650, TSG SA Rel-18 Prioritization Workshop, Dec. 9-10, 2021, Electronic meeting, 5 pages.
V. Mnih, et al., "Asynchronous methods for deep reinforcement learning," in International conference on machine learning. PMLR, 2016, pp. 1928-1937.
"New SID on Study on UPF enhancement for Exposure and SBA", 3GPP Tdoc SP-211652, TSG SA Meeting #SP-94E, Dec. 14-20, 2021, Electronic meeting, 4 pages.
Salim, J. Khosravi et al., Linux Netlink as an IP Services Protocol, Network Working Group, RFC: 3549, Informational, Jul. 2003, 72 pages.

* cited by examiner

METHODS AND APPARATUS FOR ANALYTICS-BASED USER PLANE OPTIMIZATION

CROSS REFERENCE TO RELATED APPLICATIONS

This application is a U.S. National Stage Application under 35 U.S.C. § 371 of International Patent Application No. PCT/US2023/016627, filed Mar. 28, 2023, which claims the benefit of U.S. Provisional Patent Application No. 63/324,457 filed Mar. 28, 2022, which is incorporated herein by reference.

BACKGROUND

This application is related to wired and/or wireless communications, including, for example, carrying out any of analytics-based user plane optimization, including e.g., analytics-based operation for access traffic steering, splitting and switching (ATSSS).

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications Systems

Figure 1A:
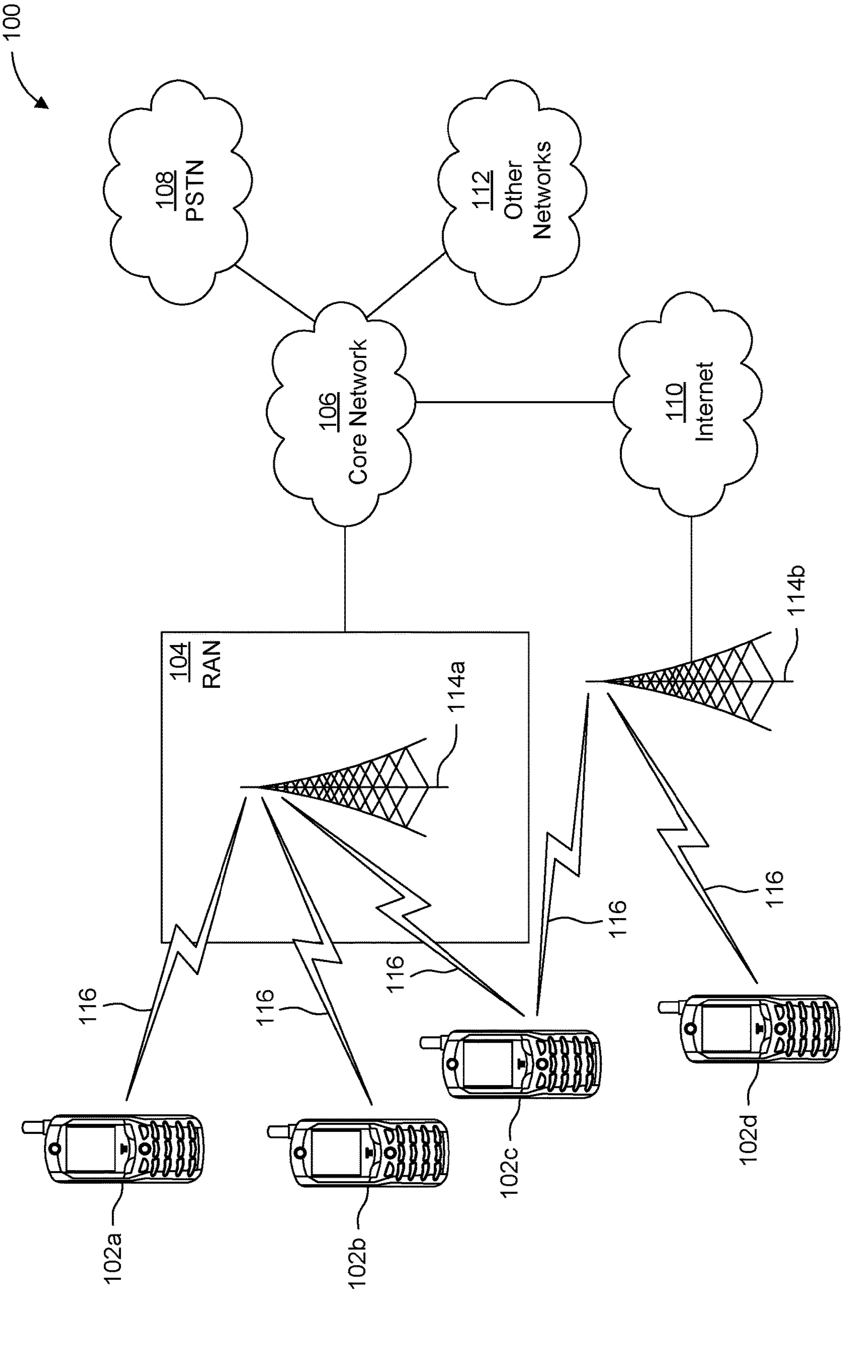
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT)

device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
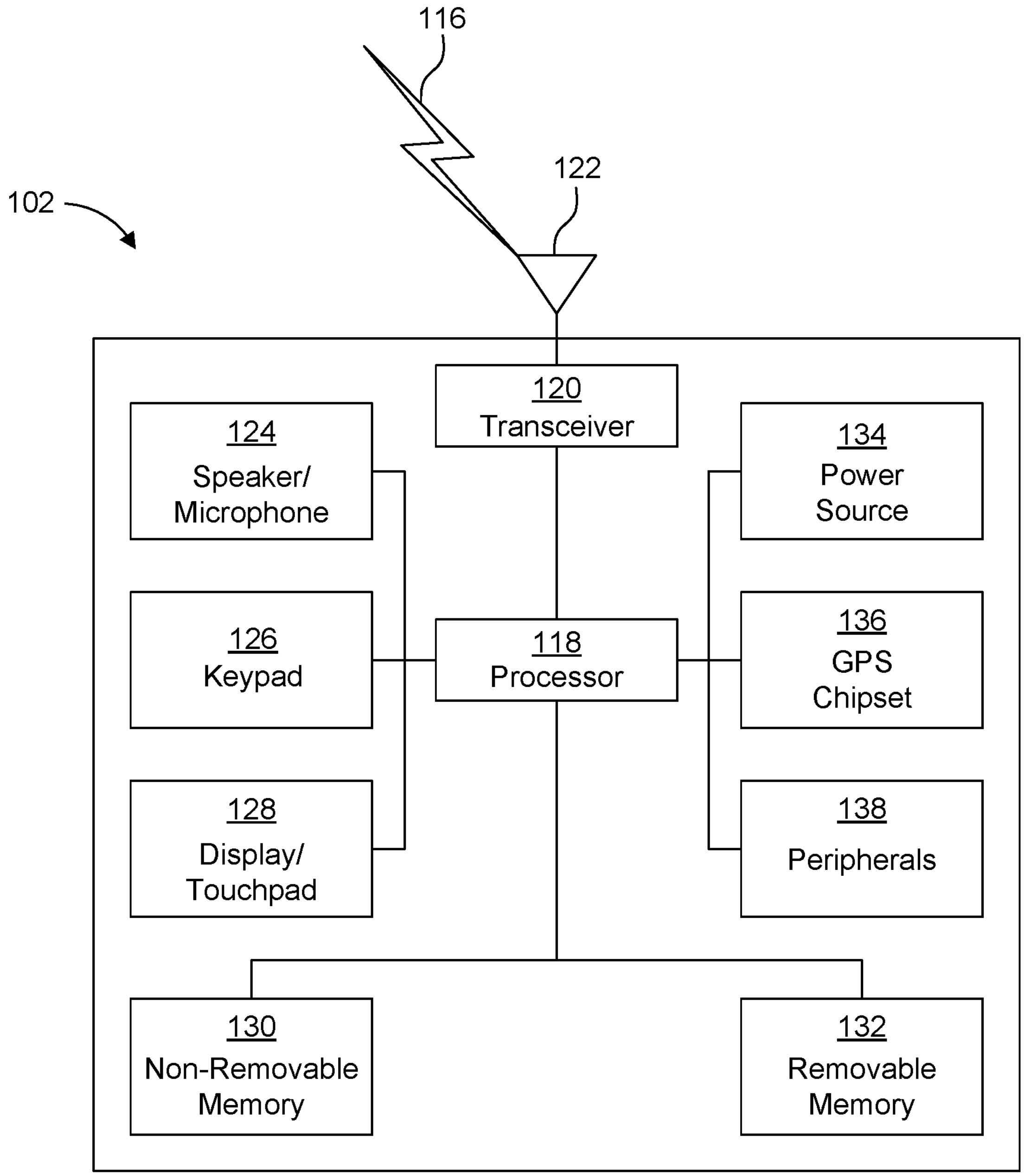
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
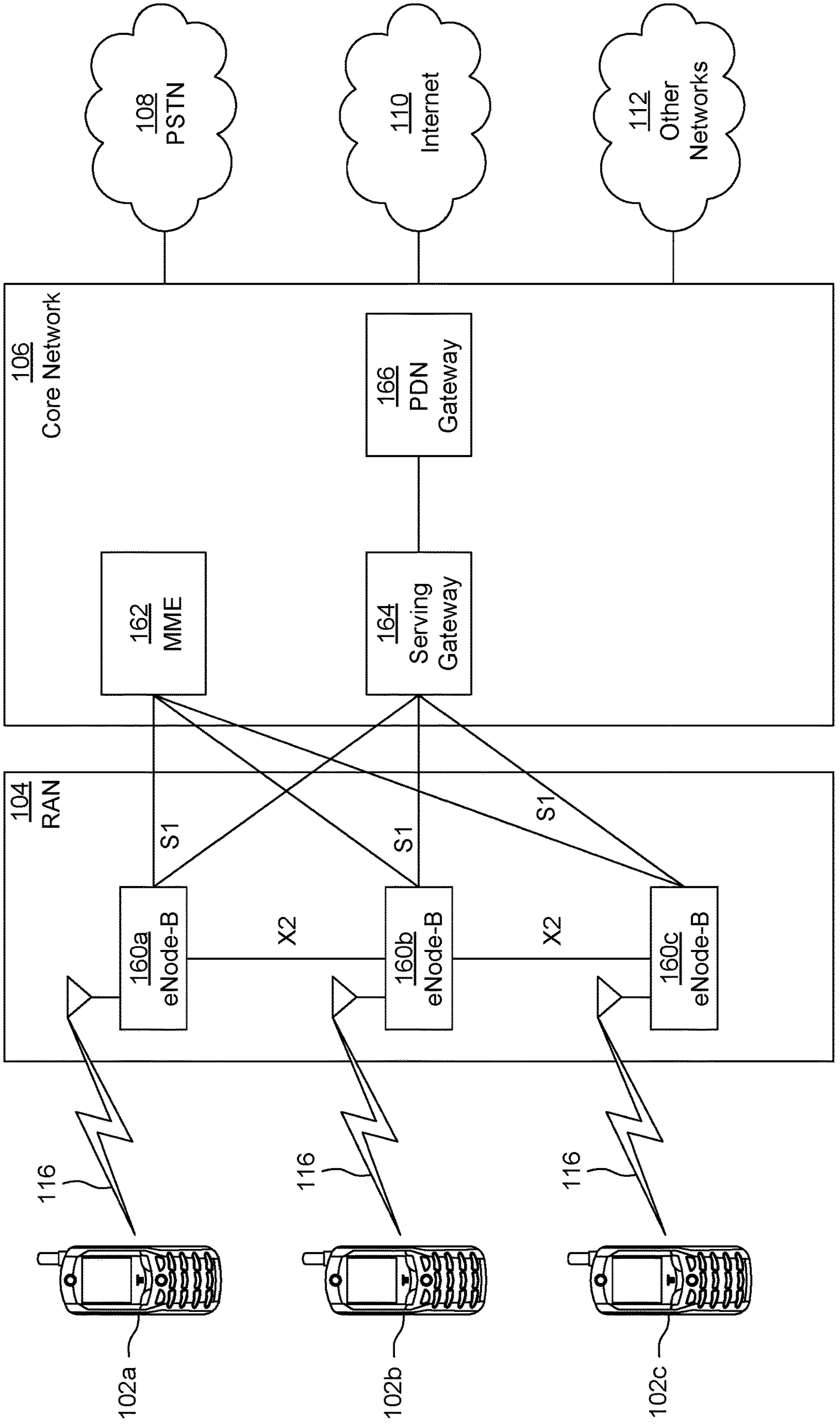
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
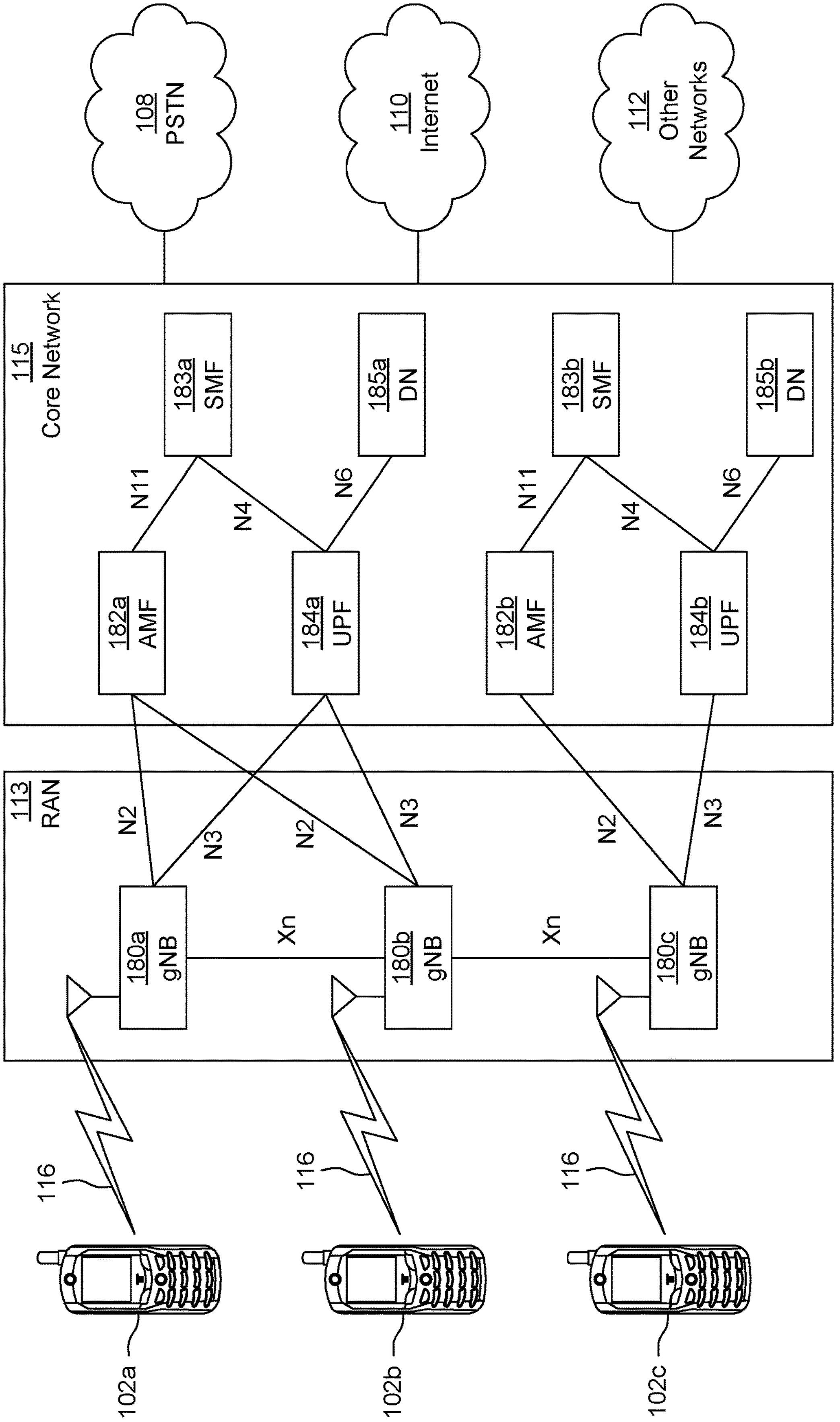
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the uplink (UL) and/or downlink (DL), support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182*a*, 182*b* may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

Access Traffic Steering, Splitting and Switching (ATSSS)

An access traffic steering, splitting and switching (ATSSS) framework enables the combined use of a plurality of access networks (e.g., 3GPP and non-3GPP access networks). It enforces access traffic steering/splitting/switching strategies, via N4 rules to a UPF and via ATSSS rules to a WTRU. For example, a given traffic steering rule (the steering rule term is used to represent steering/splitting/switching modes) may assign a fraction of ongoing traffic onto the first (e.g., 3GPP) network and the rest of the traffic to the second (e.g., non-3GPP) network. Another example may be an assignment of a priority indicator for one of the access networks to consider as the first option to steer the traffic flows. ATSSS has been studied in 3GPP SA2 in Release 16 and Release 17. Also, recently, a phase 3 ATSSS study item proposal has been accepted for Release 18.

Per 3GPP specifications as of In Release 16, ATSSS [1], a total of four steering modes were defined, namely, (i) an active-standby steering mode, (ii) a smallest delay steering mode, (iii) a static load-balancing steering mode and (iv) a priority-based steering mode.

The active-standby steering mode is used to steer all traffic of a multi-access protocol data unit (MA-PDU) session to one access only, which is called the "Active" access. The other access serves as a "standby" access and takes traffic only when the active access becomes unavailable. The terms "packet data unit" and its abbreviation "PDU" may be referred to interchangeably with the terms "protocol data unit" (e.g., in accordance with 3$^{rd}$ Generation Partnership Project ("3GPP"); Technical Specification Group Services and System Aspects; System architecture for the 5G System (5GS); Stage 2, (Release 17), 3GPP TS 23.501 v17.3.0.).

The smallest delay steering mode is used to steer traffic to the high priority access, which is the one that can provide the smallest round trip time (RTT) performance. A performance measurement function (PMF) can be used to determine the latency of each access link or alternatively multipath transmission control protocol (MPTCP) can be used to obtain such latency measurements.

The static load-balancing steering mode is used to split traffic across both access networks according to a proportion for how much traffic that should be sent over 3GPP access and over non-3GPP access, A weight information element is used to indicate the proportion of the traffic to be forwarded to 3GPP and non-3GPP access networks. Per 3GPP specifications as of Release 16, static load-balancing steering mode is only applicable to non-guaranteed bit rate quality of service (non-GBR QoS) flow.

The priority-based steering mode is used to steer all traffic matching a rule, promulgated by a policy charging control (PCC) network element, to a high priority access network, until such access network is determined to be congested. The two accesses are assigned a priority, and all traffic of the MA-PDU session is sent to the high priority access. When congestion arises on the high priority access, new data flows (the "overflow" traffic) are sent to the low priority access. Also, when the high priority access becomes suddenly unavailable, all traffic is forwarded to the other access (low priority). Note should be taken that the definition of a congested link is implementation specific.

Release 17 ATSSS [2] introduced a new steering mode called autonomous steering mode and described features to be considered during the normative phase. Pursuant to the autonomous steering mode, a WTRU and UPF can freely and independently decide how to split the traffic across the two accesses when load-balancing steering mode is in use. For all steering modes, the network may provide a WTRU-assistance indication, which indicates that (a) the WTRU can decide how to distribute the UL traffic based on its internal state (e.g., battery level), and (b) the WTRU can request the UPF to apply the same distribution for the DL traffic, and the UPF can take the WTRU's request into account when deciding the DL transmission traffic distribution. For all steering modes, the WTRU requests the UPF to apply the same distribution for the DL traffic by using the PMF protocol, if available, or another mechanism, if the PMF protocol is not available. This other mechanism will be determined during the normative phase of the work. For the load-balancing steering mode with fixed weights and priority-based steering mode, it can be possible to apply a threshold condition, which indicates whether a measured parameter is above or below a threshold. The measured parameter in a threshold condition may include (a) the RTT (e.g., derived from a packet delay budget (PDB)) and (b) the packet loss rate (derived from the maximum packet loss rate (MPLR) or the packet error rate (PER)). Also, the threshold conditions will be the same for both 3GPP and non-3GPP accesses since QoS requirements are per service data flow (SDF)/service.

Per 3GPP specifications as of Release 18, ATSSS [3] will study objectives to enhance the ATSSS feature, such as (i) how to support redundant traffic steering which replicates the packets (for both GBR and non-GBR traffic) on both accesses, and (ii) studying how the traffic of an MA PDU session can be switched between two non-3GPP access paths in the same public land mobile network (PLMN).

Enablers for Network Automation (eNA) and Network Data Analytics Function (NWDAF)

3GPP has studied eNA in Release 16 and Release 17 only for 5G core (5GC) network functions (NFs). In Release 17, there were use cases and key issues around real-time data collection and analytics delivery, NWDAF-assisted user plane optimization, NWDAF assisting in user plane performance, and user plane optimization for the edge. In general, the NWDAF is used for data collection and data analytics. Certain analytics can be performed by a 5GC NF independently; hence, an NWDAF instance specific to that analytic may be collocated with the 5GC NF. The data utilized by the 5GC NF as input to analytics could also be made available to allow for the centralized NWDAF deployment option. 5GC NFs and operations administration and management (OAM) decide how to use the data analytics provided by an NWDAF to improve the network performance.

An NWDAF utilizes the existing service-based interfaces (SBI) to communicate with other 5GC NFs and OAM. A 5GC NF may expose the result of the data analytics to any consumer NF utilizing an SBI [4]. For example, for an NWDAF-assisted user plane optimization: (i) service experience/quality of experience (QoE) data is collected from an application function/network exposure function (AF/NEF); (ii) QOS flow-level network data collected from AMF (e.g., location/area of interest), SMF (e.g., QoS Flow Identifier (QFI), Single-Network Slice Selection Assistance Information (S-NSSAI), UPF info, data network name (DNN), WTRU ID), UPF (e.g., bit rate, packet delay, packet (re) transmission), policy control function/session management function (PCF/SMF) (e.g., application ID); (iii) per Access network performance data collected from UPF such as access type (3GPP or non-3GPP) and DL round trip time; and (iv) WTRU level network data from OAM such as per WTRU measurements on reference signal receive power (RSRP), reference signal receive quality (RSRQ), signal to interference noise ratio (SINR), cell energy saving state.

Based on the collected input data, the NWDAF provides service experience per UP (user plane) path statistics/predictions, including service experience of RAT type or network performance level over the access type, its spatial validity, validity period, and prediction confidence. Although it is assumed that how the NWDAF collects data from the UPF is not defined in Release 17, there is a new study item for SA2 Release 18 called UPF enhancement for Exposure and SBA (FS_UPEAS) [5], and also there is a phase 3 study item for eNA which also focusses on supporting UPF data reporting for analytics [6].

Artificial Intelligence/Machine Learning (AI/ML)-Based Services (AIMLsys)

The use cases and the potential performance requirements for 5G system support of Artificial Intelligence (AI)/Machine Learning (ML) model distribution and transfer (e.g., download, upload, updates, etc.) are studied in 3GPP as an AI/ML model transfer (AMMT) as a study item in 3GPP SA1 Release 18 [7]. The study item also identifies traffic characteristics of AI/ML model distribution, transfer and training for various applications (e.g., video/speech recognition, robot control, automotive, other verticals, etc.). The aspects related to AI/ML operation splitting between AI/ML endpoints, AI/ML model/data distribution and sharing over 5G system and Distributed/Federated Learning over 5G system are addressed. Some of the requirements in the AMMT study assume that AI/ML service support at the application client is running on the WTRU. As noted above, analytics and/or predictions within the 5GC have been performed by NWDAF for network automation purposes. In SA2 Release 18, an evolution of 5GS is proposed for supporting device-based application AI/ML training or inference services under an AIMLsys study item [8]. More specifically, the Release 18 AIMLsys study focusses on [8]: (i) 5GS information exposure extensions for 5GC NF(s) to expose WTRU and/or network conditions and performance prediction (e.g., location, QoS, load, congestion, etc.) and whether and how to expose such information to the WTRU and/or to the authorized 3rd party to assist the Application AI/ML operation; (ii) enhancements of external parameter provisioning to 5GC (e.g., expected WTRU activity behaviors, expected WTRU mobility, etc.) based on Application AI/ML operation; (iii) investigating enhancements of other 5GC features that could be used to assist the AI/ML operations (e.g., to assist Application layer inference feedback); (iv) studying of possible QoS Policy enhancements to support Application AI/ML operational traffic while supporting regular (non-Application-AI/ML) 5GS user traffic; and (v) studying whether and how 5GS provides assistance to the AF and the WTRU for the AF and the WTRU to manage the "in time" federated learning (FL) operation and model distribution/redistribution.

Private Networks

Non-Public Network (NPNs), in other words Private Networks, were introduced in Release 16 with basic functions, and further enhanced in Release 17 to enable wider cooperation between different networks/different entities to support use cases for NPN to provide access for WTRU. The private networks can be either totally separated from the mobile network operator's (MNO's) network such as a stand-alone non-public network (SNPN) or partly integrated with the public network such as a public network integrated non-public network (PNI-NPN). In Release 18, NPN is going to be further studied to (i) support for direct connection of non-3GPP access networks to the SNPN's 5GC and (ii) support of enabling Localized Services such as high-resolution video service in a venue/stadium via a local hosting NPN [9]. There are already non-3GPP access technologies which are in use in various venues such as enterprises and campuses, and it is foreseen that such non-3GPP access technologies will continue to evolve. The integration of these existing assets in the SNPN would add flexibility to the SNPN operators.

Issues Arising in Legacy Systems

The current working principle of Release 16 ATSSS can be described as follows:

i. The PCF defines ATSSS policies and sends these policies to the SMF.
ii. The SMF generates ATSSS rules based on the policy information received from the PCF, and the WTRU/UPF receives ATSSS/N4 rules from the SMF. These rules include steering modes along with priority indexes, weight factors, etc., depending on the chosen steering modes, in order to indicate how the uplink/downlink traffic should be routed across 3GPP and non-3GPP accesses.
iii. The WTRU/UPF performs measurements and compares them with the configured reporting thresholds.
iv. The WTRU/UPF compares the measurements with the corresponding measurement thresholds, that are configured by the operator, to determine how to steer the traffic.

In this workflow, the WTRU and UPF cannot flexibly distribute the traffic over 3GPP and non-3GPP accesses according to real-time link status. In other words, the traffic distribution is based on a pre-determined weight factor which is provided by the network operator as a PCF rule. As noted above, in Release 17, a new steering mode named autonomous steering mode is proposed as a solution for the noted problem. Accordingly, the working principle of this mode is as follows:

i. The PCF/SMF either does not send a pre-determined weight factor or sends an initial weight factor (for Release 16 WTRU, PCF/SMF will send a pre-determined weight factor), and
ii the WTRU and the UPF dynamically adjust the weight factor for each access on uplink and downlink (for Release 16 WTRU, the WTRU and the UPF do not adjust the weight factor), respectively.

Such a procedure has the following drawbacks:

a. First, there is no way for the network operators to simultaneously incorporate their preferences that may reflect their charging policies or service level agreements (SLAs) and enable user plane optimization that the autonomous steering mode can achieve;
b Second, as the WTRU and UPF use the performance measurements to adjust the weight factor dynamically, the performance measurements may change from one epoch to another due to increase/decrease of the traffic load on both accesses. Thus, there can be situations where the weight factors of the different accesses change frequently for similar values like a ping-pong effect, increasing the weight factor in one epoch and decreasing it in the next epoch;
c. Third, as the network may provide a WTRU-assistance indication, which indicates that the WTRU can decide how to distribute the UL traffic based on its internal state (e.g., battery level), and can request the UPF to apply the same distribution for the DL traffic, the WTRU's request would be based on a selfish decision and may not be in favor of the overall network performance (i.e., the network and the other WTRUs that are using the network). Currently, neither the UPF's capabilities to have this decisioning mechanism nor how the UPF takes each WTRU's request into account when deciding the DL transmission traffic distribution are defined.

A solution to overcome the first and third drawbacks may consider, firstly, the weight factors adjustment by an implementation specific amount (stepwise increase/decrease) when one of the access' links is considered as broken (i.e., not within the configured thresholds). Then, after both accesses are considered as valid (i.e., within the configured thresholds), the weight factors may be re-adjusted to the one indicated by the PCF. Although, such a solution may prevent too much divergence from the rules indicated by the PCF, it does not mean that it guarantees a convergence to the PCF rules/weight factor. Also, the proposed stepwise increase/decrease approach either: (i) will not provide a full flexibility for the WTRU and the UPF as it considers the scenario where only one of the accesses is valid; or (ii) will suffer from the noted ping-pong effect.

As noted in the second drawback, the WTRU and UPF decide the weight factors based on the combination of the current (real-time) link status and the thresholds for RTT, UL/DL Maximum Packet Loss Rate, UL/DL Maximum Jitter as well as the WTRU's internal state (e.g., battery level), there is no mechanism defined for the WTRU and UPF to either improve the overall network performance for a local area of interest or have proactive/predictive decisions instead of reactive ones.

Figure 2:
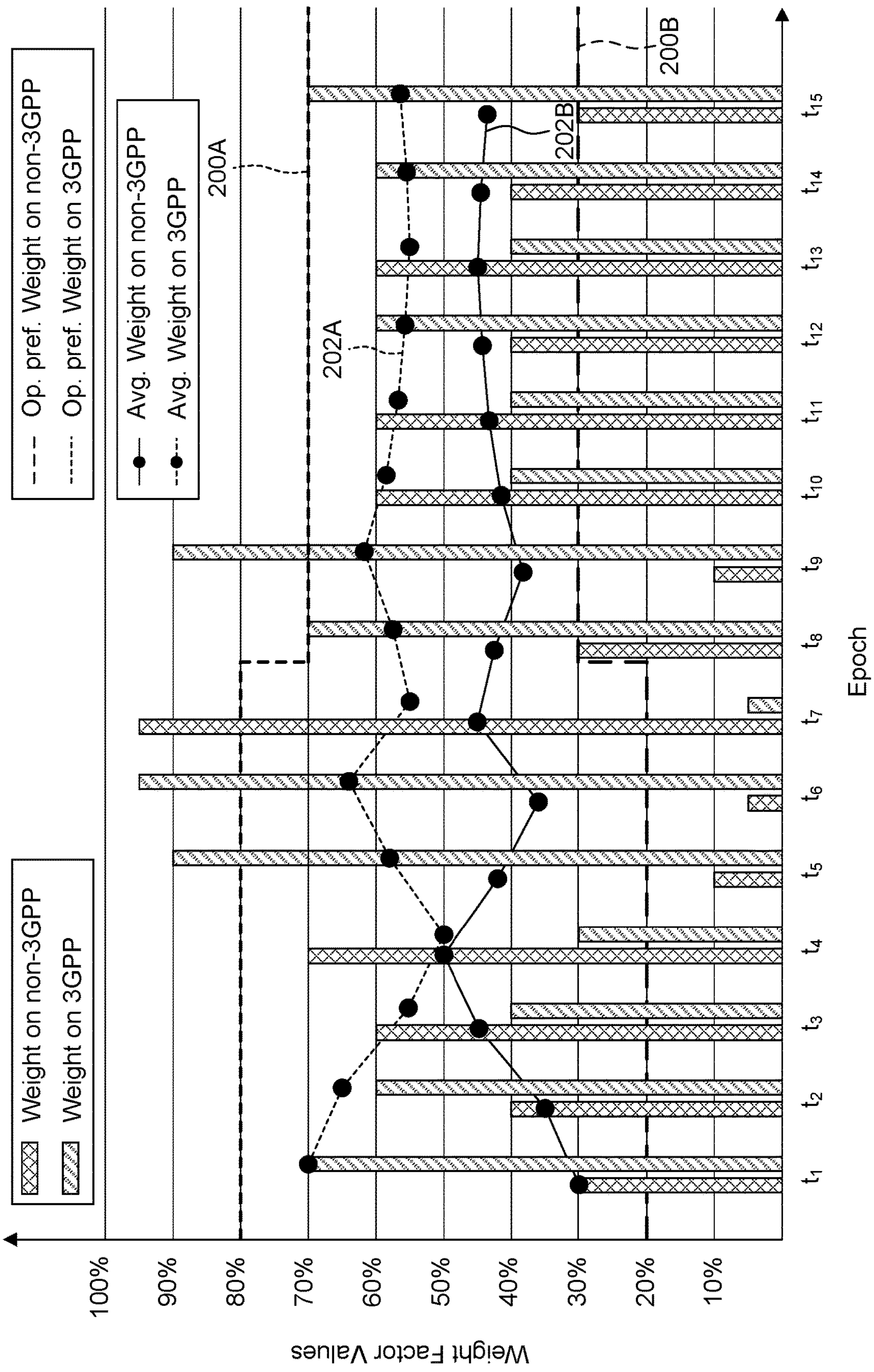
FIG. 2 is a graph illustrating an example for a wireless transmit receive unit and/or user plane function (WTRU/UPF) to flexibly decide weight factors on first and second access networks.

In order to clarify the noted drawbacks, FIG. 2 illustrates an example in which the WTRU/UPF can flexibly decide the load-balancing weight factors. In FIG. 2, lines 200A and 200B represent the operator preference (Op. pref.) for both 3GPP and non-3GPP access technologies, respectively, and lines 202A and 202B represent the instantaneous average (Avg.) of weight factor assignments on 3GPP and non-3GPP networks, respectively. An epoch t1 to t15 is a function of time and is defined by a fixed time interval.

In autonomous steering mode, the network may assign initial weights, but these weights can be overwritten by the WTRU and UPF. Accordingly, neither the WTRU nor the UPF is aware of or considers the operator's preferred weight factors when they flexibly assign the weight factors. In the considered example, the operator preference is indicated as 80% onto 3GPP and 20% onto non-3GPP access networks until epoch t7, and then it is indicated as 70% onto 3GPP and 30% onto non-3GPP access networks. As the weight factor assignment is based on the instantaneous link conditions and thresholds, it is assumed that when the weight factor assignment is smaller than or equal to 10% for any of the access networks, this access network will be considered as not performing well/congested/link is not reliable, etc. For example, on the one hand, during epochs t5, t6 and t9, the non-3GPP access network is not performing well, on the other hand, during epoch t7, the 3GPP access network is not performing well. When the access networks perform as depicted in FIG. 2, there can be cases where the operator preference and the averaged weight factor assignments either diverge or do not get closer to each other. In addition to that, as noted previously, weight factor assignments based on instantaneous link conditions may lead to a ping-pong effect. Such an effect is depicted in FIG. 2 from epoch t11 to t14.

Figure 3:
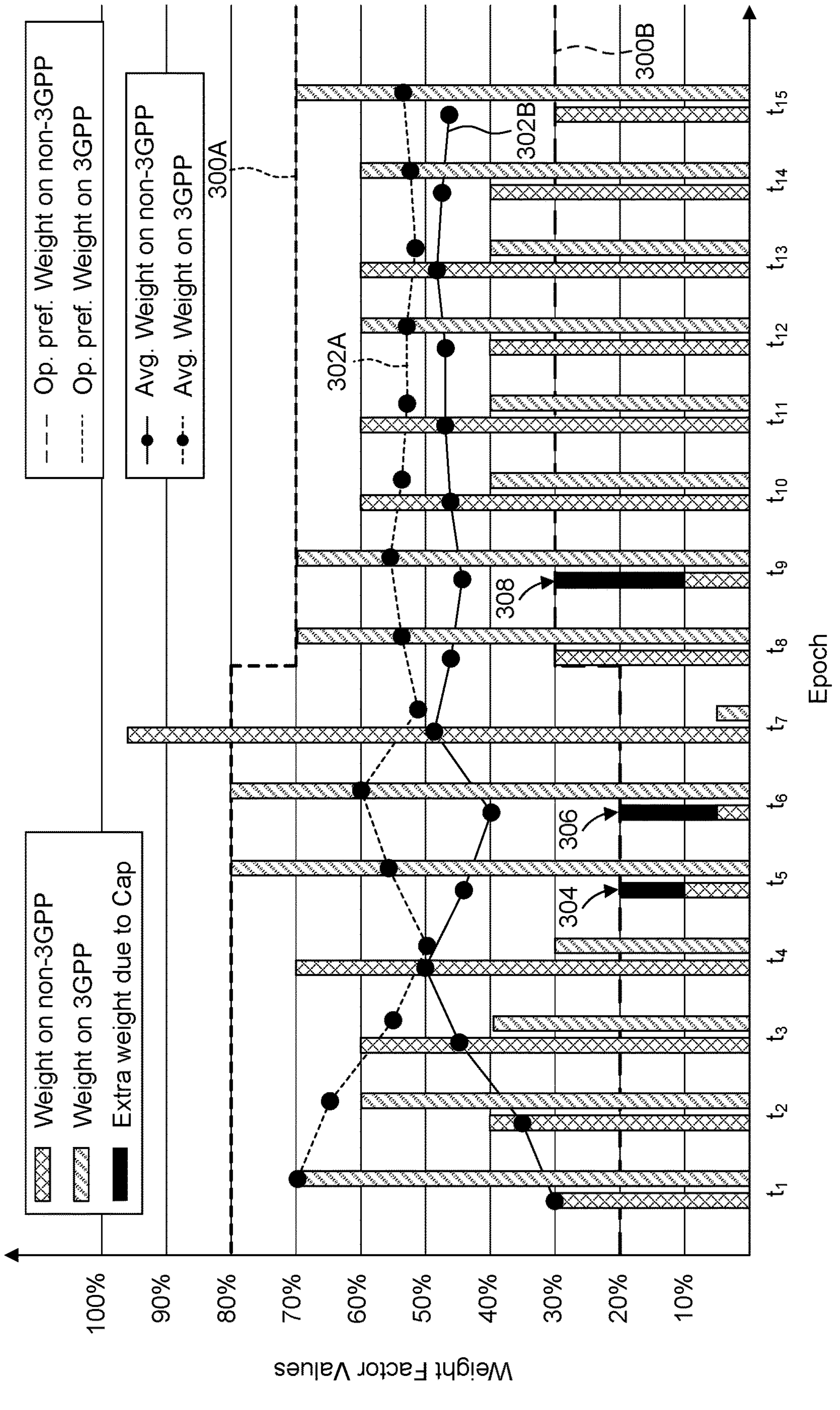
FIG. 3 is a graph illustrating an example for a WTRU/UPF to flexibly decide weight factors on first and second access networks with a constraint on a maximum allowed weight factor for the first network.

In another example, the operator preference is considered as a hard upper bound during the assignment of the weight factors onto the 3GPP access network. This case is similar to the autonomous steering mode, but this is an example for a specific case on having an upper bound when the WTRU and the UPF perform their own weight factor assignments based on the network/link conditions. Hence, the WTRU and the UPF can flexibly assign the factors with a constraint on a specific ratio on 3GPP access that the WTRU and UPF cannot exceed. The intention with this specific case is that even when such an upper bound is considered for the autonomous mode, it does not mean that the long term (this term can be configured by network) average of the weight factors will converge to the operator's preference. FIG. 3 shows this example case with the assumptions considered for the previous example shown in FIG. 2. In FIG. 3, lines 300A and 300B represent the operator preference (Op. pref.) for both 3GPP and non-3GPP access technologies, respectively, and lines 302A and 302B represent the instantaneous average (Avg.) of weight factor assignments on 3GPP and non-3GPP networks, respectively. As in FIG. 2, an epoch t1 to t15 is a function of time and is defined by a fixed time interval. In FIG. 3, areas 304, 306, and 308 represent the extra load that might be put onto the non-3GPP access network due to the weight factor cap on the 3GPP access network.

It is assumed that the access network performances are the same for both of the examples shown in FIG. 2 and FIG. 3, but the weight factor assignment in FIG. 3 has an operator configured constraint for 3GPP access network. For such a case, although the 3GPP access network can deliver more than the given constraint, the WTRU/UPF would not be able to go beyond it. Hence, more divergence between the operator preferred weight factors and averaged assignments can be expected. Moreover, as it is assumed that when the non-3GPP access network does not perform well during epochs t5, t6 and t9, there will be higher weight factor assignment onto the non-3GPP access network due to the configured limit on the weight factor of the 3GPP access network.

Within Release 17 eNA, several user plane optimization-oriented analytics are defined as previously described herein. Accordingly, NWDAF provides statistics/predictions along with their spatial validity, validity period, and prediction confidence. However, the currently defined user plane optimization-oriented analytics focus on specific cases/outputs where there is no case/output defined for statistics/predictions on ATSSS steering mode and weight factor if the steering mode is load-balanced, and the WTRU and UPF can have their own decisions for UL and DL traffic weights, respectively.

The solution on "Per Access network performance" only provides network performance level over the access type from 1 to 10 where the higher value indicates better performance. Hence, such a statistic/prediction will not be enough to have access traffic weight factor allocation. Therefore, an enhanced analytics approach would be needed to incorporate some intelligence to perform predictions on the steering modes and weight factors, not only based on the access network performance indicated in the current solution in [4] that considers average usage of assigned resources (CPU, memory, disk), average number of WTRUs observed in the area subset, average ratio of successful setup of PDU Sessions, but also access link performance, the WTRU's internal state, and the WTRU's own preference. Such enhanced analytics then can be proactively used by the WTRU, UPF, and/or SMF to improve overall access network performance as well as take into account network operator preference in the long term.

On the above basis, an intelligent traffic steering function may be implemented within the WTRU to particularly handle/distribute the WTRU's uplink traffic across the 3GPP and non-3GPP access links with almost no signaling delays. The WTRU may also engage in managing DL traffic steering at the UPF. The 3GPP system (3GS) currently does not have any defined mechanism/component/logical function at the WTRU to perform such intelligent traffic steering functionalities even though the WTRU is the best-positioned entity in the 3GS, which can access all required data/information, to make such intelligent traffic steering decisions. That said, the new intelligent component at the WTRU should also interact with the 5GC NFs (e.g., SMF, NWDAF, and UPF) directly, especially to exchange other information such as statistics and analytics, ATSSS rule assignments and weight factors, ML-related updates (neural network (NN) model construction and weights), etc. This interaction is advantageous when the WTRU assists the UPF in managing DL traffic across a MA-PDU Session and in resources optimization of the 3GPP network. For example, when the WTRU decides to move all traffic away from the 3GPP access, then it is not efficient to keep the 3GPP access resource while the WTRU does not intend to use it for the foreseeable future.

As described previously, 3GPP supports ATSSS. ATSSS has been studied in Release-16 and Release-17 and is currently under study in Release-18. Regarding the updates during Release-17, the autonomous steering mode is proposed to enable the WTRU and UPF to decide the weight factors based on the combination of the current (real-time) link status and the thresholds for RTT, UL/DL Maximum Packet Loss Rate, UL/DL Maximum Jitter, and the WTRU's internal state (e.g., battery level). As noted, for the described autonomous steering mode, there is no mechanism defined for the WTRU and UPF to either improve the overall network performance for a local area of interest or have proactive/predictive decisions. The WTRU and UPF decide on the weight factors based on the performed measurement results and comparison of the network provided threshold values for a specific type of traffic that is approved/provided by network for the WTRU and UPF to autonomously decide. Therefore, the decision(s) on the weight factors are reactive. Additionally, when the WTRU and UPF autonomously decide on how to steer traffic onto 3GPP and non-3GPP access networks, the objective becomes an optimization of the instantaneous link performance that focusses only on path performance measurements. Such autonomous decisioning introduced in Release 17 cannot provide any sort of operator influence, hence, it is only considered for a specific type of traffic approved by the operator in advance.

Issues addressed may include: (i) how can PCC/ATSSS/N4 rules be enhanced to support the WTRU and the UPF to flexibly distribute the traffic over 3GPP and non-3GPP access networks without violating the mobile network operator policies/SLAs for any kind of data traffic including AI/ML operational traffic?; (ii) how can an AI/ML-based traffic steering approach can be utilized either individually or collaboratively by the WTRU and UPF?; and (iii) What would be the interactions between the 3GPP network functions and the WTRU to enhance traffic steering rules/policies and/or dynamically manage 3GPP network resources when the ATSSS rules and/or weight factors are changed?

Overview

Procedures, methods, architectures, apparatuses, systems, devices, and computer program products directed to, and/or in connection with, analytics-aided and/or analytics-based user plane optimization are disclosed herein. Such methods, apparatuses, systems, etc., for example, may address the involvement of (methodologies and technologies configured in, implemented in and/or carried out by) analytics-based user plane optimization, including e.g., analytics-based operation for access traffic steering, splitting and switching (ATSSS).

For simplicity of exposition, the disclosure that follows is in part from a perspective of a network element and/or a network function. Those of ordinary skill in the art will recognize that much of such disclosure may be equally applicable to a WTRU, another network element (e.g., a base station or other RAN element), and/or another network function, and hence, such modifications and variations are intended to fall within the scope of the disclosure and the appended claims.

Among the procedures, methods, architectures, apparatuses, systems, devices, and computer program products is a first method that may be implemented in a first network entity and may include any of: receiving, from a second network entity, first information indicating (i) analytics based operation for access traffic steering, splitting and switching, (ii) a first weight for each of a plurality of access networks, and (iii) at least one first weighting factor for each of the plurality of access networks; transmitting, to a third network entity, second information indicating the analytics based operation for access traffic steering, splitting and switching, including the first weights and the first weighting factors; transmitting, to a fourth network entity, third information indicating one or more load metrics, wherein one or more the load metrics are based on the first weights and the first weighting factors; receiving, from the fourth network entity, fourth information indicating analytics for controlling traffic steering for a multi-access protocol data unit session, including one or more of (i) a second weight for at least one access network of the plurality of access networks and (ii) a second weighting factor for at least one access network of the plurality of access networks, wherein the analytics are based on: (a) the third information transmitted to the fourth network entity; and (b) fifth information, from the third network entity, indicating criteria for partitioning downlink traffic among the plurality of access networks; and transmitting, to at least one of the third network entity and a WTRU, sixth information indicating the one or more of (i) a second weight and (ii) a second weighting factor.

In various embodiments, the method may include transmitting, to the WTRU, seventh information indicating the analytics based operation for access traffic steering, splitting and switching, wherein the analytics are (e.g., further) based on eighth information, from the WTRU, indicating one or more criteria for partitioning uplink traffic among the plurality of access networks. In various embodiments, the method may include receiving the eighth information from the WTRU.

Among the procedures, methods, architectures, apparatuses, systems, devices, and computer program products is a first network entity that may include circuitry, including a transmitter, a receiver, a processor and memory, that may be configured to: receive, from a second network entity, first information indicating (i) analytics based operation for access traffic steering, splitting and switching, (ii) a first weight for each of a plurality of access networks, and (iii) at least one first weighting factor for each of the plurality of access networks; transmit, to a third network entity, second information indicating the analytics based operation for access traffic steering, splitting and switching, including the first weights and the first weighting factors; transmit, to a fourth network entity, third information indicating one or more load metrics, wherein one or more the load metrics are based on the first weights and the first weighting factors; receive, from the fourth network entity, fourth information indicating analytics for controlling traffic steering for a multi-access protocol data unit session, including one or more of (i) a second weight for at least one access network of the plurality of access networks and (ii) a second weighting factor for at least one access network of the plurality of access networks, wherein the analytics are based on: (a) the third information transmitted to the fourth network entity; and (b) fifth information, from the third network entity, indicating criteria for partitioning downlink traffic among the plurality of access networks; and/or transmit, to at least one of the third network entity and a WTRU, sixth information indicating the one or more of (i) a second weight and (ii) a second weighting factor.

In various embodiments, the circuitry may be configured to transmit, to the WTRU, seventh information indicating the analytics based operation for access traffic steering, splitting and switching, wherein the analytics are further based on eighth information, from the WTRU, indicating one or more criteria for partitioning uplink traffic among the plurality of access networks. In various embodiments, the circuitry may be configured to receive the eighth information from the WTRU.

In various embodiments of the first method and the first network entity, the first network entity may be and/or may include a SMF. In various embodiments of the method and the first network entity, the second network entity may be and/or may include a PCF. In various embodiments of the method and the first network entity, the third network entity may be and/or may include a UPF. In various embodiments of the the method and the first network entity, the fourth network entity may be and/or may include a NWDAF.

Among the procedures, methods, architectures, apparatuses, systems, devices, and computer program products is a second method that may be implemented in a first network entity and may include any of: receiving, from at least one of a second network entity and a WTRU, first information indicating one or more load metrics, wherein one or more the load metrics are based on (i) a first weight for each of a plurality of access networks, and (ii) at least one first weighting factor for each of the plurality of access networks; receiving, from the second network entity, second information indicating criteria for partitioning downlink traffic among the plurality of access networks; determining analytics for controlling traffic steering for a multi-access protocol data unit session, wherein the analytics are determined based on the one or more load metrics and the criteria for partitioning downlink traffic among the plurality of access networks, and wherein the analytics comprise one or more of (i) a second weight for at least one access network of the plurality of access networks and (ii) a second weighting factor for at least one access network of the plurality of access networks; and transmitting, to a third network entity, third information indicating the analytics.

Among the procedures, methods, architectures, apparatuses, systems, devices, and computer program products is a first network entity that may include circuitry, including a transmitter, a receiver, a processor and memory, that may be configured to: receive, from at least one of a second network entity and a WTRU, first information indicating one or more load metrics, wherein one or more the load metrics are based on (i) a first weight for each of a plurality of access networks, and (ii) at least one first weighting factor for each of the plurality of access networks; receive, from the second network entity, second information indicating criteria for partitioning downlink traffic among the plurality of access networks; determine analytics for controlling traffic steering for a multi-access protocol data unit session, wherein the analytics are determined based on the one or more load metrics and the criteria for partitioning downlink traffic among the plurality of access networks, and wherein the analytics comprise one or more of (i) a second weight for at least one access network of the plurality of access networks and (ii) a second weighting factor for at least one access network of the plurality of access networks; and/or transmit, to a third network entity, third information indicating the analytics.

In various embodiments of the second method and the (second) first network entity, at least some of the first information may be received from the WTRU via the second network entity. In various embodiments of the second method and the (second) first network entity, the first information may be received via the third network entity. In various embodiments of the second method and the (second) first network entity, the second information may be received via the third network entity.

In various embodiments of the second method and the (second) first network entity, the first network entity may be and/or may include a NWDAF. In various embodiments of the second method and the (second) first network entity, the second network entity may be and/or may include a UPF. In various embodiments of the second method and the (second) first network entity, the third network entity may be and/or may include a SMF. In various embodiments of the first and second method and the first network entities, the analytics may be based on a prediction for a time at which steering is to be deployed. In various embodiments of the first and second methods and the first network entities, the analytics may be any of predictive and proactive.

In various embodiments of the first and second methods and the first network entities, the analytics may be based on (e.g., further based on) ninth information, from a fifth network entity, indicating (e.g., expected) behavior of the WTRU. In various embodiments of the first and second method and the first network entities, the fifth network entity may be and/or may include an AMF.

In various embodiments of the first method and the (first) first network entity, the analytics based operation may be and/or may include an analytics based load balance operation for the ATSSS.

In various embodiments of the first and second methods and the first network entities, any of the second weight and second weighting factor may be based on any of one or more performance measurements, one or more operator preferences, and one or more preferences of the WTRU. In various embodiments of the first and second methods and the first network entities, the performance measurements may be received from an OAM entity. In various embodiments of the first and second methods and the first network entities, the operator preferences may be received from the second network entity. In various embodiments of the second method and the (second) first network entity, the one or more operator preferences are received from the third network entity. In various embodiments of the first and second methods and the first network entities, the second weight may be and/or may include a revised version of one of the first weights. In various embodiments of the first and second methods and the first network entities, the second weighting factor may be and/or may include a revised version of one the first weighting factors.

In various embodiments, a method may be implemented in a WTRU and may include any of receiving, by from a network, one or more load balancing rules, wherein the one or more load balancing rules may be based on any of one or more performance measurements, one or more operator preferences regarding load assignment onto first and second networks, and one or more WTRU preferences regarding the load assignment onto the first and second networks; and steering traffic, by the WTRU, onto the first and second networks based at least in part on the load balancing rules.

In various embodiments, the method may include any of receiving, by the WTRU from the network, an indication of analytics-aided (analytics-based) load balance operation; and transmitting, by the WTRU to the network in response to the indication, information concerning the one or more WTRU preferences regarding the load assignment onto the first and second networks.

In various embodiments, the load balancing rules may include one or more load balancing weight factors. In various embodiments, the load balancing weight factors may be based on the performance measurements, the operator preferences, and/or the WTRU preferences.

In various embodiments, the method may include, the WTRU receiving the load balancing rules from a network entity (element) of the network. In various embodiments, the network entity may be a network data analytics function (NWDAF) of the network. In various embodiments, the NWDAF may provide the load balancing rules to the WTRU and to a user plane function (UPF). In various embodiments, both of the WTRU and UPF may receive the load balancing rules. In various embodiments, the NWDAF may provide the load balancing rules via a session management function (SMF).

In various embodiments, the load balancing rules may be predictive and/or proactive.

In various embodiments, the load balancing rules may include multi-access traffic management (MATM) rules. In various embodiments, the MATM rules may and/or may be used to configure the WTRU to adjust (e.g., dynamically adjust) one or more load balancing weight factors in a load balancing traffic steering mode of operation. In various embodiments, the MATM rules may, and/or may be used to, configure (e.g., further configure) the WTRU to switch (e.g., dynamically switch) between traffic steering modes of operation.

In various embodiments, the method may include implementing, by the WTRU, the MATM rules as a machine learning (ML) component having a neural network (NN) model.

In various embodiments, the method may include training (e.g., dynamically training) and/or updating (e.g., dynamically updating) of the NN model. In various embodiments, the method may include training (e.g., dynamically training) and/or updating (e.g., dynamically updating) of the NN model according to one or more conditions of, and/or associated with, the WTRU. In various embodiments, the conditions may include any of a traffic pattern, mobility, available capacity and the like.

In various embodiments, the first network may be and/or may include a first access network. In various embodiments, the second network may be and/or may include a second access network. In various embodiments, the first network may be and/or may include a 3GPP network. In various embodiments, the second network may be and/or may include a non-3GPP network. In various embodiments, the 3GPP network may be and/or may include a 3GPP access network. In various embodiments, the non-3GPP network may be and/or may include a non-3GPP access network.

In various embodiments, an apparatus, which may include any of a processor and memory, configured to perform a method as in at least one of the preceding embodiments.

In various embodiments, the apparatus may be, be configured as and/or configured with elements of a WTRU. In various embodiments, the apparatus may be, be configured as and/or configured with elements of a network entity. In various embodiments, the apparatus may be, be configured as and/or configured with elements of a base station or other network element (e.g., one or more RAN or CN element).

Representative Network Analytics Based Access Traffic Steering

In an embodiment, new analytics/prediction information is considered when deciding the steering mode as well as the weight factor assignment in the case of load-balanced steering. Such analytics/prediction information may be provided by the NWDAF.

As noted above, the current analytics-oriented solutions for user-plane optimization do not provide enhanced analytics to incorporate any intelligence in performing predictions on the steering modes and weight factors along with the operator preference on the load assignment onto a plurality of access networks (e.g., one or more 3GPP access networks and one or more non-3GPP access networks) as well as network/link conditions. Therefore, in one embodiment, a new analytics ID, named "Multi-Access Traffic Steering Control", is considered to be provided by the NWDAF. The terms "a plurality of access networks", "3GPP and non-3GPP access networks", and "first and second access networks" may be used interchangeably and are interchangeable in the disclosure that follows.

Figure 4:
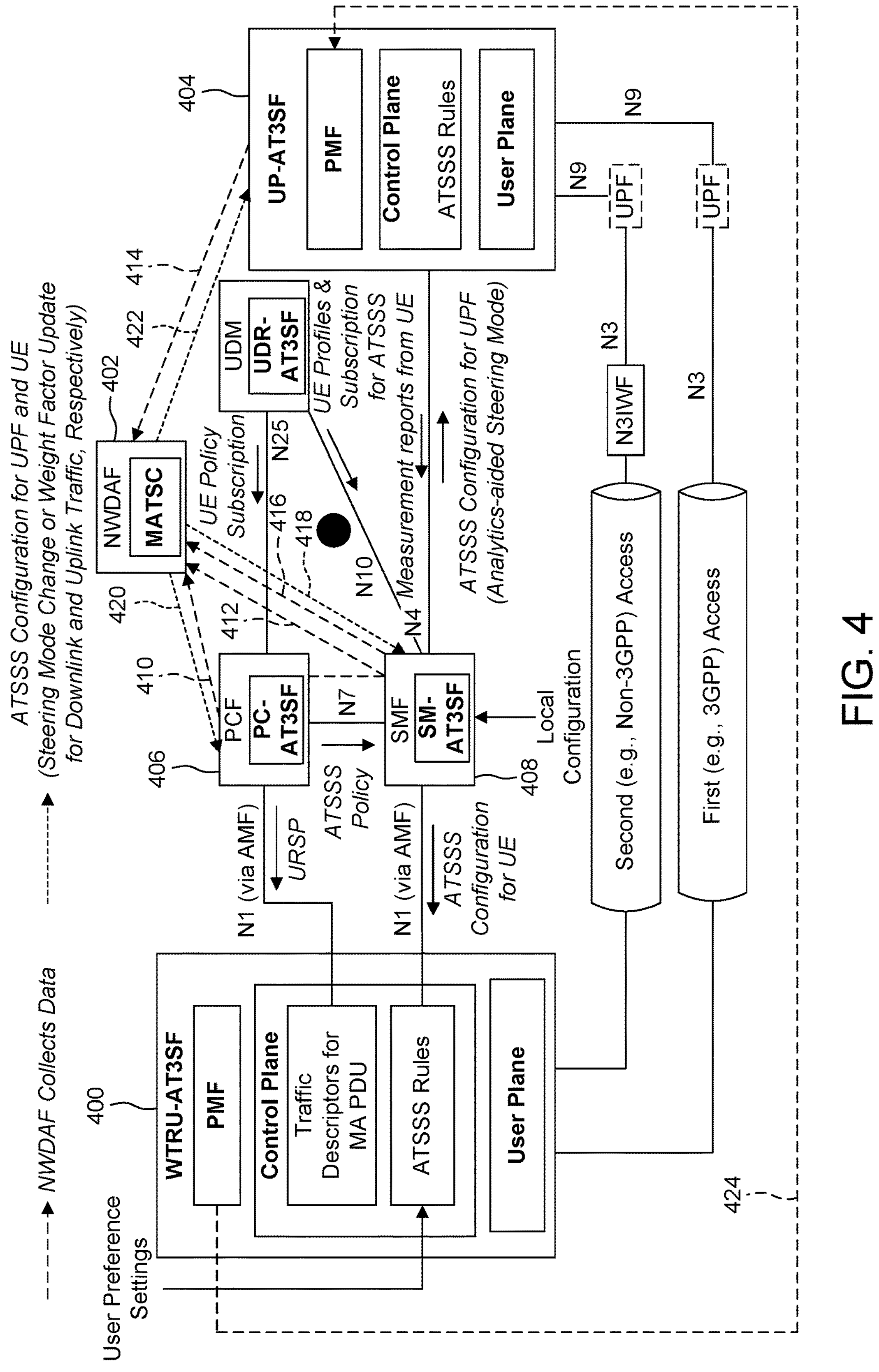
FIG. 4 is a system block diagram illustrating interactions between access traffic steering, splitting and switching (ATSSS) related functions and/or entities according to an embodiment.

FIG. 4 depicts the existing ATSSS procedure and the proposed analytics-aided solution along with considered signaling. The terms "analytics-aided" and "analytics-based" may be used interchangeably and are interchangeable in the disclosure that follows. In FIG. 4, "AT3SF" stands for ATSSS function for relevant NFs, "PMF" stands for performance measurement function, and "MATSC" inside NWDAF stands for multi-access traffic steering control analytics ID. FIG. 4 depicts interactions between a WTRU 400, an NWDAF 402, a UPF 404, a PCF 406, and a SMF 408.

In order for the NWDAF to conduct analytics and perform predictions, the NWDAF needs to gather telemetry data from various network nodes, including UPF, WTRU, PCF, and SMF. In addition to that, NWDAF may make use of the existing analytics, such as network performance analytics, WLAN performance analytics, redundant transmission experience related analytics, WTRU related analytics, and others noted in Table 7.1.0-2 in 3rd Generation Partnership Project; Technical Specification Group Services and System Aspects; Architecture enhancements for 5G System (5GS) to support network data analytics services (Release 17), 3GPP TS 23.288 v.17.4.0 (2022-03) (herein after "3GPP TS 23.288 v.17.4.0") for the multi-access traffic steering control analytics. Moreover, the NWDAF may also make use of the Core network-assisted RAN parameters such as WTRU behavior statistics, expected WTRU behavior, and other available WTRU-related information that is used to optimize WTRU RRC and CM state transitions.

In order to indicate the steering mode to be used is going to be the one for which the NWDAF generates the weight factors, in one embodiment, an indicator may be added to Multi-Access Rules (MAR), which is part of N4 rules provided by the SMF to the UPF. This indication may be named "analytics-aided load balance operation" and may be part of the existing Steering Mode Indicator attribute in MAR. In another embodiment, the same indicator named "analytics-aided load balance operation" may also be included in ATSSS rules that are sent to WTRUs (via AMF). The indicator enables the WTRU to provide some further information, such as battery status, preferred access type, etc. to be considered as part of the NWDAF analytics generation/prediction process.

As the NWDAF analytics and/or predictions would include the operator's preference, NWDAF may have information regarding the operator preference on the load assignment onto 3GPP and non-3GPP access networks. In one embodiment, the operator preference may be provided directly by the PCF 406 as shown at 410. In another embodiment, as the SMF 408 receives the ATSSS policy from the PCF 406 and derives or otherwise determine ATSSS and N4 rules accordingly, the operator preference may be derived and provided by the SMF 408 to the NWDAF 402 as shown at 412. The terms "derives" and "determines" may be used interchangeably and are interchangeable in the disclosure that follows.

The NWDAF 402 may make use of the existing correlation information provided in Table 6.2.4-1 [10] to correlate the UPF, OAM, SMF, AMF and PCF data.

The NWDAF 402 may utilize path performance measurements conducted by the PMF. In one embodiment, the PMF may be located outside the UPF 404 and the PMF may provide the path performance measurements directly to the NWDAF 402. In another embodiment, the PMF may be co-located with the UPF 404, and the path performance measurements may be provided along with the UPF reporting/telemetry data including usage/session report, data rate, packet delay, packet transmission, packet retransmission, data volume for UL and DL directions, etc. as shown at 414.

In order for the UPF 404 to provide a session report that is going to be used by the NWDAF 402 to predict weight assignment when the steering mode is chosen as load-balancing and the steering mode indicator is chosen as "analytics-aided load balance operation" in MAR, the UPF 404 may be informed by using an information element in session reporting rule (SRR) named "Access Load Control Information" that indicates to the UPF 404 to report when the weight factor of an access type becomes higher or lower than the operator-preferred weight. When the UPF 404 sends the session report to inform the detected events for a PDU Session that are related to an SRR, either: (i) not only the SMF 408 will be informed but also the NWDAF 402 as shown at 414; or (ii) the SMF 408 will provide the report to NWDAF 402 with an attribute named "Access Load Report" that indicates the change of 3GPP or non-3GPP access weight factor, compared to an operator-preferred weight as shown at 416. The "Access Load Report" may be utilized by the NWDAF 402 either to improve or trigger analytics/predictions.

As noted previously herein, Release 17 ATSSS has considered a WTRU-assistance indicator for a WTRU to indicate its preference to the UPF on how to distribute UL traffic when the steering mode is chosen as load-balancing. When each WTRU performs some actions to indicate its preference, these preferences would end up being WTRU-selfish decision and may not help to improve the overall network performance, including network-wide or area of interest-based energy efficiency, throughput, etc. In one embodiment, the proposed "analytics-aided load balance operation" may utilize the WTRU-assistance indicator to consider not only network conditions and operator preference but also a WTRU's preference, which may be based on the WTRU's internal state. How (and what) WTRU performs the actions to decide on its preference on UL traffic as well as DL traffic is discussed in detail later herein. After the WTRU 400 has decided its preference, on the one hand, WTRU 400 may use existing procedures, such as: (i) WTRU assistance operation defined in [11, Section 5.32.5.5] which is sending a PMF-UAD (WTRU assistance data) message to UPF as shown at 424; or (ii) using a WTRU application to provide WTRU data to the NWDAF 402 via an AF, as explained in [10, Section 6.2.8]. Additionally, the WTRU 400 may provide its preferences to 5GC NFs (e.g., SMF/PCF/UPF) via the control plane through SMF/AMF. This embodiment is discussed later herein in great detail.

When the NWDAF 402 performs predictions/analytics for multi-access traffic steering control analytics ID, a set of options to utilize the analytics output may be described as follows:

Option A: The SMF 408 subscribes to the "Multi-Access Traffic Steering Control" analytics available in the NWDAF 402. The NWDAF 402 may provide the load balancing weight factors to the SMF 408 as shown at 418, and then, the SMF 408 may inform the UPF 404 and WTRU 400 of the analytics-aided load balance weights by using the modified N4 and ATSSS rules, respectively. The NWDAF 402 may also provide information on the updated rules to the PCF 406 as shown at 420.

Option B: As the network may enable the WTRU 400 and UPF 404 to flexibly distribute the UL and DL traffic when the autonomous steering mode is chosen, the UPF 404 may subscribe to the NWDAF 402 to use the analytics-aided load balance weights. As the proposed "Multi-Access Traffic Control" analytics may consider the operator preference, the operator may enable the NWDAF 402 to apply the analytics-aided load balance weights not only for operator permitted traffic types but also for any kind of traffic. In one embodiment, for such operation, the operator may indicate a time window (e.g., for a specific event) and/or location (e.g., for a specific venue or private network environment) as one or more criteria for the NWDAF 402 to take control of load-balancing weight assignments. Then, the NWDAF 402 may provide the load balancing weight factors to the UPF 404 as shown at 422 and the WTRU 400 via UPF/SMF 404/408. NWDAF 402 may also provide information on the updated rules to the PCF as shown at 420.

Option C: An external AF, which may be an ML-based AF, may also utilize the "Multi-Access Traffic Control" analytics by using the existing procedures defined in along with the proposed indicators for the analytics-aided load balancing operation. After the AF performs the decision on the load balancing weight factors, the AF may either use: (i) an approach similar to Option A in which the AF informs the SMF 408 of the assigned weight factors and the SMF 408 distributes the N4 and ATSSS rules to the UPF 404 and WTRU 400, respectively; or (ii) an approach similar to Option B in which the AF informs the UPF 404 directly.

Figure 5:
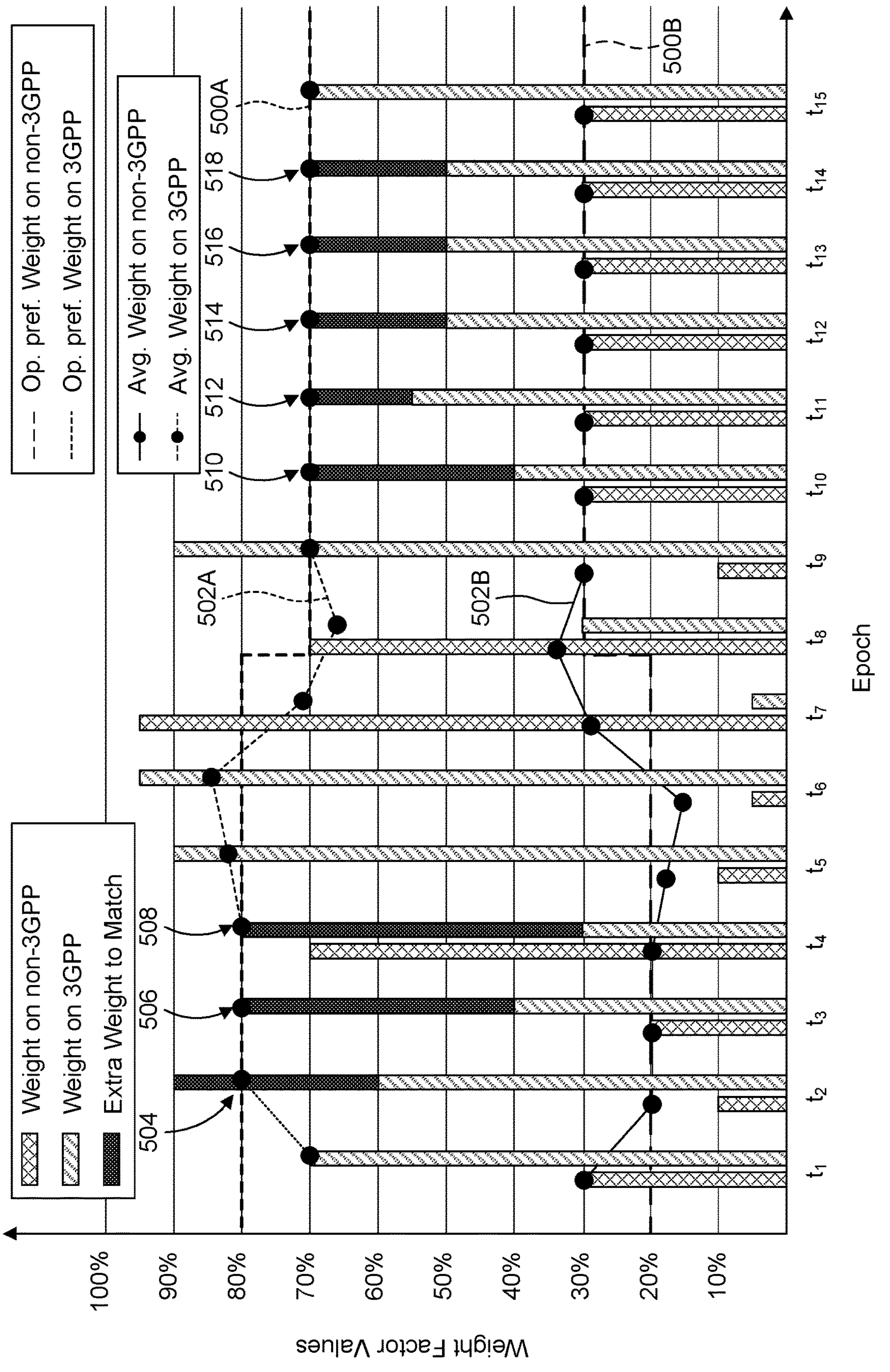
FIG. 5 is a graph illustrating an example of an embodiment that enables a WTRU/UPF to flexibly decide weight factors on first and second access networks with consideration of an operator's preference.

In order to clarify the possible outputs from the analytics-aided load balancing operation, FIG. 5 illustrates an example case in which the NWDAF decides the load-balancing weight factors.

In FIG. 5, lines 500A and 500B represent the operator preference (Op. pref.) for both 3GPP and non-3GPP access technologies, respectively, and lines 502A and 502B represent the instantaneous average (Avg.) of weight factor assignments on 3GPP and non-3GPP networks, respectively. As in FIG. 2 and FIG. 3, an epoch t1 to t15 is a function of time and is defined by a fixed time interval. In FIG. 5, areas 504-518 represent the extra load that might be put onto the non-3GPP access network to match with the operator's preference.

Similar to FIG. 2 and FIG. 3: (i) the operator preference in FIG. 5 is indicated as 80% onto 3GPP and 20% onto non-3GPP access networks, as shown at 500A and 500B, respectively; and (ii) when the weight factor assignment is smaller than or equal to 10% for any of the access networks, this access network will be considered as not performing well/congested/link is not reliable. As the weight factor assignment is based on the Multi-Access Traffic Steering Control analytics/predictions, which consider the operator preference as well as network conditions, divergence from the operator preference only happens in a short period of time. For a long run, the analytics-aided load balancing weights converge with the operator preference. In addition to that, the analytics-aided weight factor assignment does not lead to a ping-pong effect as such conditions may be foreseen and proactively prevented by the embodiments disclosed herein.

Figure 6:
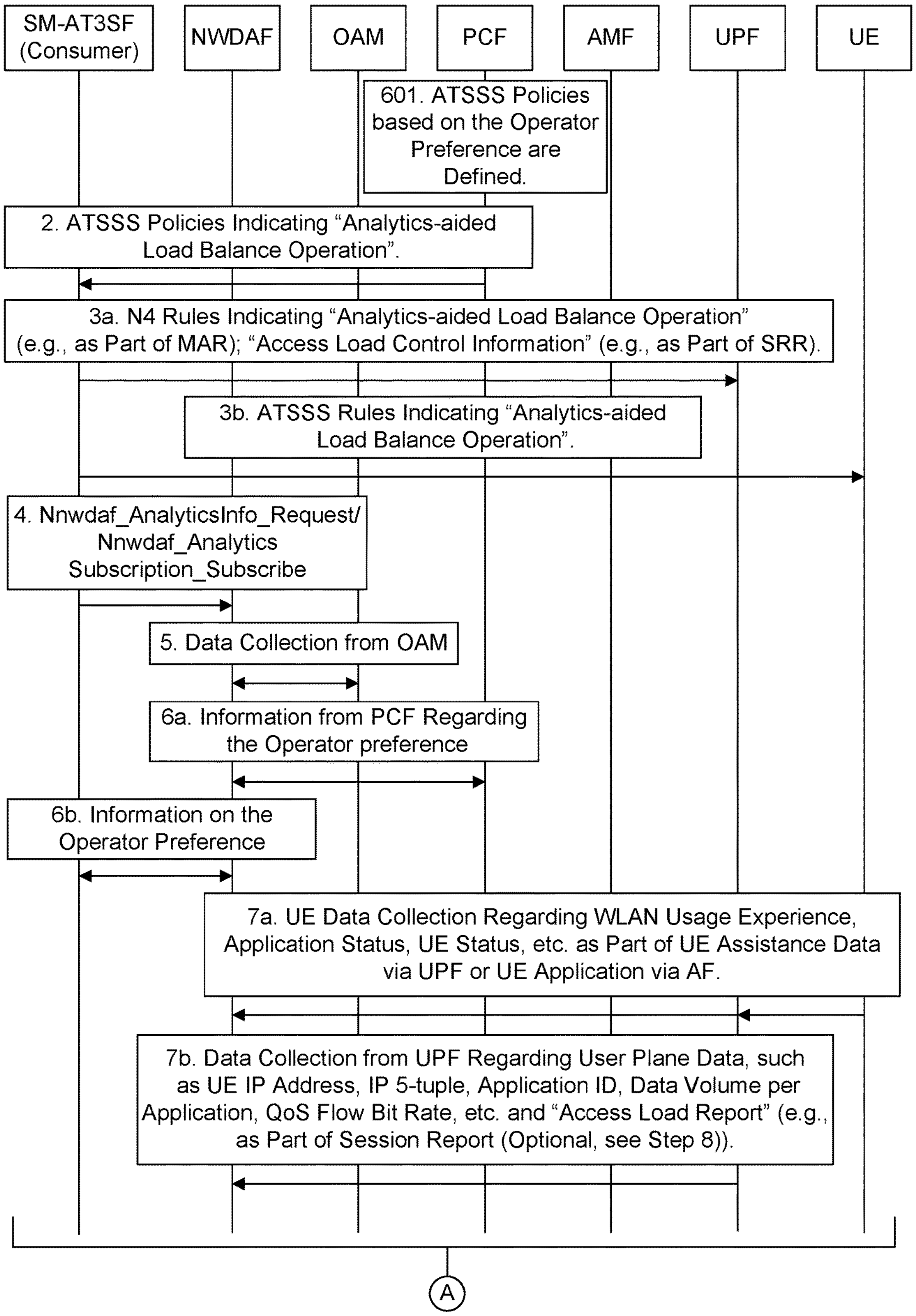
FIG. 6 is a signaling diagram illustrating example interactions between 5G core (5GC) network functions and/or entities according to an embodiment.
Figure 6:
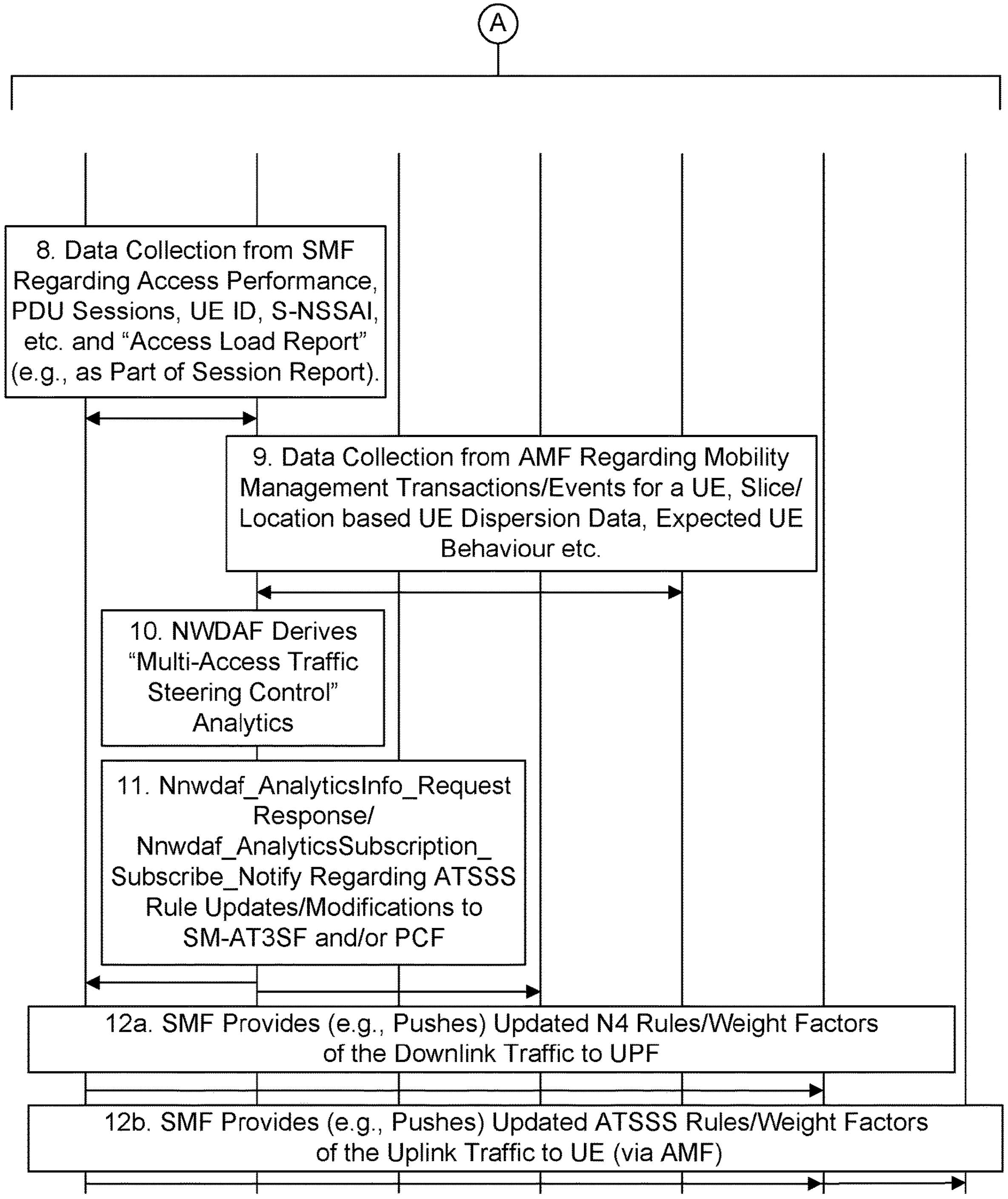

FIG. 6 is a message flow diagram illustrating an example of interactions of NFs according to an embodiment. The exemplary illustration of the message flow shown in FIG. 6 may regard: subscription, by a SMF, to an NWDAF for the multi-access traffic steering control analytics ID; collection of data by the NWDAF; provision of analytics/predictions, by the NWDAF, to the SMF; and provision of updates, by the NWDAF, to the PCF. This message flow is defined as an option A for utilizing the multi-access traffic steering control analytics/predictions. The SMF may distribute the analytics-aided load balancing weight factors to a WTRU and a UPF.

Referring to FIG. 6, the PCF may define an ATSSS policy. The PCF may define the ATSSS policy and/or the ATSSS policy may be based on an operator preference (WTRU policy subscription from UDM) (600-1).

The PCF may send the ATSSS policy to the SMF and/or may indicate that an analytics-aided load balance operation may be applied (600-2).

The SMF may derive N4 rules based on the ATSSS policy (from the PCF) and/or may send N4 rules to the UPF (600-3*a*). The N4 rules may indicate analytics-aided load balance operation (e.g., as part of MAR), and/or may indicate access load control information (e.g., as part of SRR). The SMF may derive ATSSS rules based on the ATSSS policy (from the PCF) and/or may send the ATSSS rules to the WTRU. The ATSSS rules may indicate analytics-aided load balance operation (600-3*b*).

The SMF may subscribe to the NWDAF for notifications on the multi-access traffic steering control analytics ID (600-4).

The NWDAF may collect historical data on access network performance and the WTRU from an OAM system (600-5). The historical data may include WTRU measurements (e.g., RSRP, RSRQ, SNR, etc.), MDT measurements (e.g., WTRU speed, WTRU orientation, etc.), and/or RAN status (e.g., radio resource utilization, performance per cell ID, etc.). The NWDAF may collect information on operator preference from the PCF (600-6*a*) and/or the SMF (600-6*b*). The information on operator preference may be for weight factor assignment onto first (e.g., 3GPP) and second (e.g., non-3GPP) access networks.

The NWDAF may collect WTRU-related data (600-7*a*) (e.g., WLAN usage experience, WTRU application status, WTRU status (including battery), etc.). The NWDAF may collect the WTRU-related data from the WTRU (e.g., from WTRU assistance data via a UPF or from a WTRU application via AF). The NWDAF may collect path performance measurements data from the UPF (600-7*b*). This data may include an access load report (e.g., as or as part of a session report (optional, see 600-8).

The NWDAF may collect session related data from the SMF. This data may include access load report (e.g., as or as part of a session report) (600-8).

The NWDAF may collect mobility management and/or core network assistance related data from the AMF. The core network assistance data may include one or more expected WTRU behaviors.

The NWDAF may derive multi-access traffic steering control analytics and/or predictions (600-8), e.g., based on and/or utilizing the various collected information. The NWDAF may utilize other analytics to improve the predictions for multi-access traffic steering control. The other analytics may be and/or may include existing WTRU related analytics and other analytics noted in Table 7.1.0-2 of 3GPP TS 23.288 v.17.4.0, reproduced below.

TABLE 7.1-2

Analytics information provided by NWDAF

| Analytics Information | Request Description | Response Description |
|---|---|---|
| Slice Load level information | Analytics ID: load level information | Load level provided as number of UE registrations and number of PDU sessions for a Network Slice and Network Slice instances as well as resource utilization for Network Slice instances. |
| Observed Service experience information | Analytics ID: Service Experience | Observed Service experience statistics or predictions may be provided for a Network Slice or an Application. They may be derived from an individual UE, a group of UEs or any UE. For slice service experience, they may be derived from an Application, a set of Applications or all Applications on the Network Slice. |
| NF Load information | Analytics ID: NF load information | Load statistics or predictions information for specific NF(s). |
| Network Performance information | Analytics ID: Network Performance | Statistics or predictions on the load in an Area of Interest; in addition, statistics or predictions on the number of UEs that are located in that Area of Interest. |
| UE mobility information | Analytics ID: UE Mobility | Statistics or predictions on UE mobility. When visited AOI(s) is included in the Analytics Filter information, only statistics on UE mobility can be provided. |
| UE Communication information | Analytics ID: UE Communication | Statistics or predictions on UE communication. |
| Expected UE behavioural parameters | Analytics ID: UE Mobility and/or UE Communication | Analytics on UE Mobility and/or UE Communication. |

TABLE 7.1-2-continued

Analytics information provided by NWDAF

| Analytics Information | Request Description | Response Description |
|---|---|---|
| UE Abnormal behaviour information | Analytics ID: Abnormal behaviour | List of observed or expected exceptions, with Exception ID, Exception Level and other information, depending on the observed or expected exceptions. |
| User Data Congestion information | Analytics ID: User Data Congestion | Statistics or predictions on the user data congestion for transfer over the user plane, for transfer over the control plane, or for both. |
| QoS Sustainability | Analytics ID: QoS Sustainability | For statistics, the information on the location and the time for the QoS change and the threshold(s) that were crossed; or, for predictions, the information on the location and the time when a potential QoS change may occur and what threshold(s) may be crossed. |
| Session Management Congestion Control Experience | Analytics ID: Session Management Congestion Control Experience | Statistics on session management congestion control experience for specific DNN and/or S-NSSAI. |
| Redundant Transmission Experience | Analytics ID: Redundant Transmission Experience | Statistics or predictions aimed at supporting redundant transmission decisions for URLLC services. |
| WLAN performance | Analytics ID: WLAN performance | Statistics or predictions on WLAN performance of UE. |
| Dispersion | Analytics ID: UE Dispersion | Statistics or predictions that identify the location (i.e., areas of interest) or network slice(s) where a UE, or a group of UEs disperse their data volume, or disperse mobility or session management transactions or both. |
| DN Performance | Analytics ID: DN Performance | Statistics or predictions on user plane performance for a specific Edge Computing application. |

3GPP TS 23.288 v. 17.4.0 is incorporated herein by reference in its entirety.

The NWDAF may provide an output of the multi-access traffic steering control analytics and/or predictions to the SMF (SM-AT3SF to take action) and/or the PCF (to inform weight factor assignment) (600-11).

The SMF may derive N4 rules and ATSSS rules, e.g., based on and/or using the multi-access traffic steering control analytics and/or predictions. The SMF may provide (e.g., transmit) the N4 rules, which may include updated analytics-aided weight factors for DL traffic, to the UPF (600-12*a*). The SMF may provide (e.g., transmit) the ATSSS rules, which may include updated analytics-aided weight factors for UL traffic, to the WTRU (600-12*b*).

The SMF (or other network entity) may provide (e.g., transmit) to the WTRU multiple sets of ATSSS rules and/or ATSSS rule selection criteria. The ATSSS rule selection criteria may be used (e.g., by the WTRU) to determine which set of the multiple sets of ATSSS rules to apply (e.g., at any given time). The SMF may derive the ATSSS rule selection criteria, e.g., based on and/or using the multi-access traffic steering control analytics and/or predictions. The ATSSS rule selection criteria may be based on a location (e.g., determined location) of the WTRU, measurement results of the WTRU, information that is received from the UPF (e.g., via PMF signaling), etc.

The SMF (or other network entity) may provide (e.g., transmit) to the UPF multiple sets of N4 rules and/or N4 rule selection criteria. The N4 rule selection criteria may be used (e.g., by the UPF) to determine which set of the multiple sets of N4 rules to apply (e.g., at any given time). The SMF may derive the N4 rule selection criteria, e.g., based on and/or using the multi-access traffic steering control analytics and/or predictions. The N4 rule selection criteria may be based on measurement results of, and/or associated with, the UPF, information that is received from the WTRU (e.g., via PMF signaling), etc.

Representative Intelligent Traffic Steering Rule Update

The embodiments described above may assist a UPF and a WTRU in dynamically adjusting their traffic steering modes for both downlink and uplink traffic based on analytics and/or predictions provided by the NWDAF. The disclosures above are excellent for traffic steering at a UPF (i.e., for downlink traffic of the WTRU), provided that the NWDAF/SMF may inform (e.g., directly inform) the UPF, via the 5G control plane, about new traffic steering rules and/or weights and/or weighting factors (in the case of load-balancing mode), e.g., with minimal signaling delays. This capability may not be the case for uplink traffic of the WTRU because delivering traffic steering decisions from the 5GC to the WTRU may incur some delays due to, for example, the steering decisions (i.e., transmission carrying and/or indicating the steering decisions) may pass through one or more entities, such as an SMF, an AMF, and an NG-RAN. This delay may not be tolerable with latency-sensitive applications that may utilize separate first and second (e.g., 3GPP and non-3GPP) access links via ATSSS with MA-PDU sessions.

Another potential issue may arise with respect to ATSSS rules being delivered to the WTRU from the 5GC. The issue is mainly related to a scenario in which connectivity between the WTRU and a RAN (e.g., a base station, such as gNB) is poor and/or unstable. In such scenario, a cellular link between the WTRU and RAN may be likely unavailable. One result of the cellular link between the WTRU and RAN being unavailable is that the 5GC cannot deliver any signaling (e.g., control messages and/or information) to the WTRU. Even if connectivity (e.g., a cellular link and/or other connections) between the WTRU and RAN is available, but it is poor, control messages and/or information may be delivered to the WTRU after a long delay, e.g., due to backlogs at an RLC buffer and/or multiple retransmissions at the MAC layer. Additionally, the delivery of control messages and/or information may get delayed when the RLC buffer at the base station (e.g., gNB) is congested due to downstream traffic of the WTRU.

An intelligent traffic steering function within the WTRU may handle and/or distribute the uplink traffic of the WTRU across the first and second (e.g., 3GPP and non-3GPP) access links with limited, minimized or no delays due to signaling. The WTRU may be the best-positioned entity in a 3GPP system (3GS), in that it may access and/or have access to required data/information (e.g., all required data/information) to make intelligent traffic steering decisions in a timely fashion (e.g., immediately). The WTRU may access various locally available information, such as any of available capacity of the first and second (e.g., 3GPP and non-3GPP) access link, a RTT between the WTRU and RAN, a RTT between the WTRU and an N3IWF (e.g., WiFi-AP), an RLC buffer size of the first (e.g., cellular (3GPP)) access, a number of backoffs in the case of the second (e.g., Wi-Fi (non-3GPP) access, a number of retransmission at the MAC layer of both the first (e.g., cellular) access and the second (e.g., Wi-Fi) access, RSRPs and RSRQ across some or all access types. The WTRU may have behavior and/or trend-oriented information that may be extracted by an application in the WTRU and may help the WTRU to perform intelligent steering decisions.

A new machine learning (ML) based component may be integrated into a WTRU (e.g., into a WTRU-AT3SF), and may be referred to as multi-access traffic management ("MATM"). The WTRU-AT3SF may run at the application layer and may interact with other ATSSS-related components, such as a PMF via HTTP/2. For interactions with the ATSSS-HL (MPTCP), the MATM may use an inter-process communication (IPC) interface, such as the Linux Netlink Socket [12]. The choice of the IPC interface may be dependent on an operating system of the WTRU. The MATM may govern traffic steering functionality for UL and/or DL across all available access links (involved in an MA-PDU Session) in connection with the PCF/SMF activating ATSSS load-balancing traffic steering mode with an indication of ML-based WTRU-aided load-balance mode during a MA-PDU session establishment procedure.

The MATM may be activated with other ATSSS steering modes when the ML-based steering mode indicator is provided. In this way, the MATM may switch (e.g., dynamically switch) the ATSSS steering mode for an application, e.g., according to forecasted network conditions of the access links. With Rel. 17, the autonomous steering mode indicator may be activated only when the steering mode is load-balancing. The MATM may also be activated with the proposed steering mode indicator, previously referred to herein as analytics-aided load balance operation.

The MATM may utilize an ML technique (e.g., Reinforcement Learning (RL), A3C [13], DDPG [14], etc.) which may dynamically train and/or update its neural network model (NN). As a result, each WTRU may make more intelligent decisions over time by continuously updating an initially trained model provided to the MATM according to the WTRU's conditions (e.g., traffic pattern, mobility, available capacity, etc.). The NWDAF (MTLF) may be used within 5GC to provide an NN update for the MATM on a regular basis over the N1 interface via AMF (i.e., over a NAS message related to ATSSS signaling).

The MATM may directly interact with 5GC via the control plane or the user plane (via an AF). In the case of the control plane, the MATM may use the SM-Signaling to interact with the SMF directly. The SMF may also relay the MATM message to any other 5GC NFs via an API call. The SMF may use additional information in the NAS message to forward the MATM message to its destination if it is needed (e.g., if the MATM message is destined to an NWDAF instance). If the WTRU intends to subscribe to the NWDAF (MTLF) to get an event notification, then the SMF may hold a mapping between the intended Analytics Id and PDU Session Id.

Similar to the NWDAF, the MATM may decide on the traffic steering mode and/or the traffic steering's weight coefficients/factors, in the case of the load-balancing traffic steering mode, predictively and proactively, according to the current network condition of all available access links. Note that the MATM may run multiple instances of MATM to produce required predictions, depending on how the ML algorithm of the MATM is formulated. In the case of multi-instance MATM, the first instance may be used for selecting the traffic steering mode, and the second instance may be used to select the weight coefficients during the load-balancing mode.

For example, the MATM may completely move the WTRU's uplink traffic from the cellular link to the WiFi link when it predicts that cellular connectivity will deteriorate shortly (e.g., in the next 100 ms).

Representative Interactions Among MATM and Other Entities within WTRU and 5GC

Figure 7:
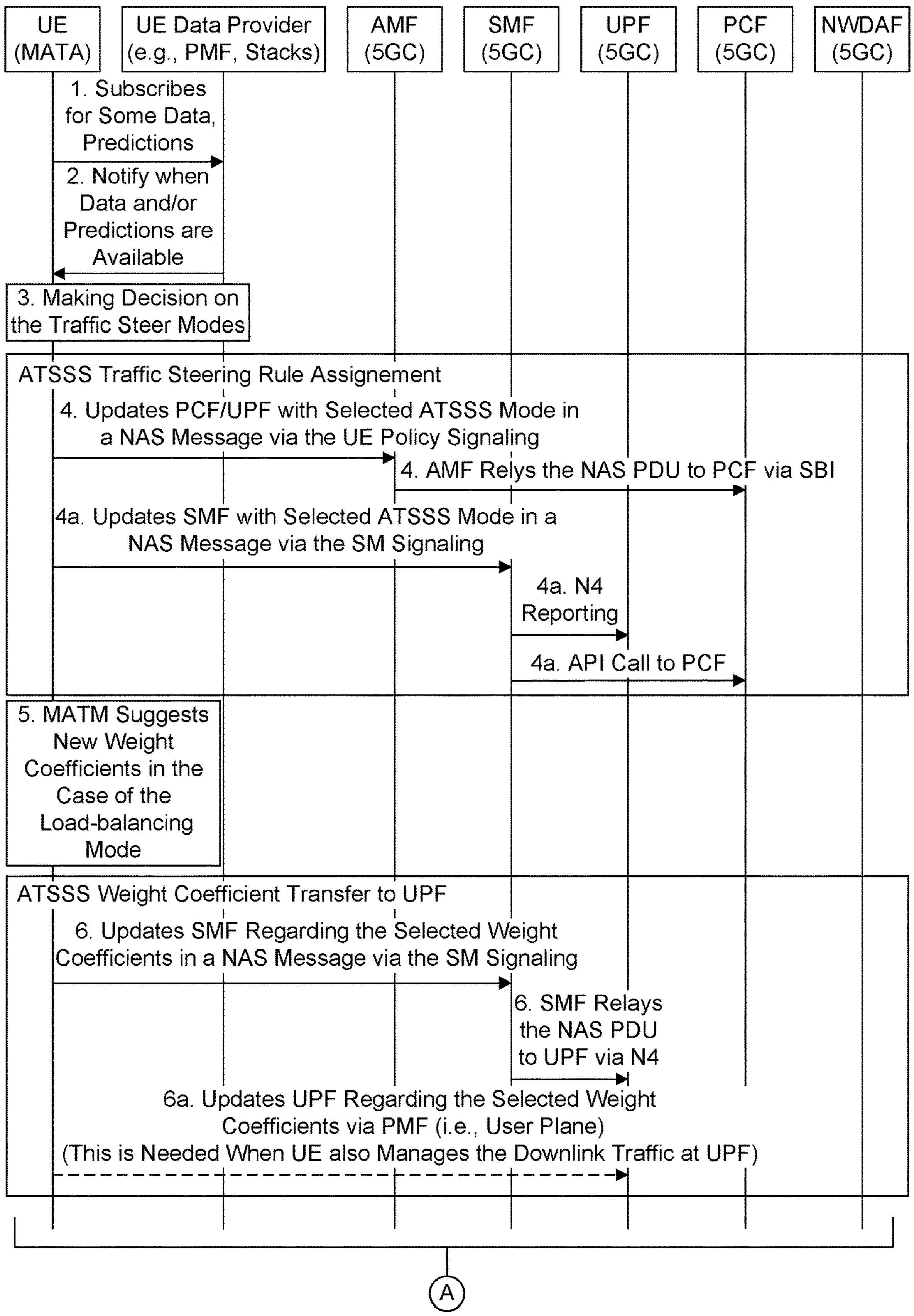
FIG. 7 is a signaling diagram illustrating interactions between a multi-access traffic manager (MATM) with other components/modules of a WTRU according to an embodiment.
Figure 7:
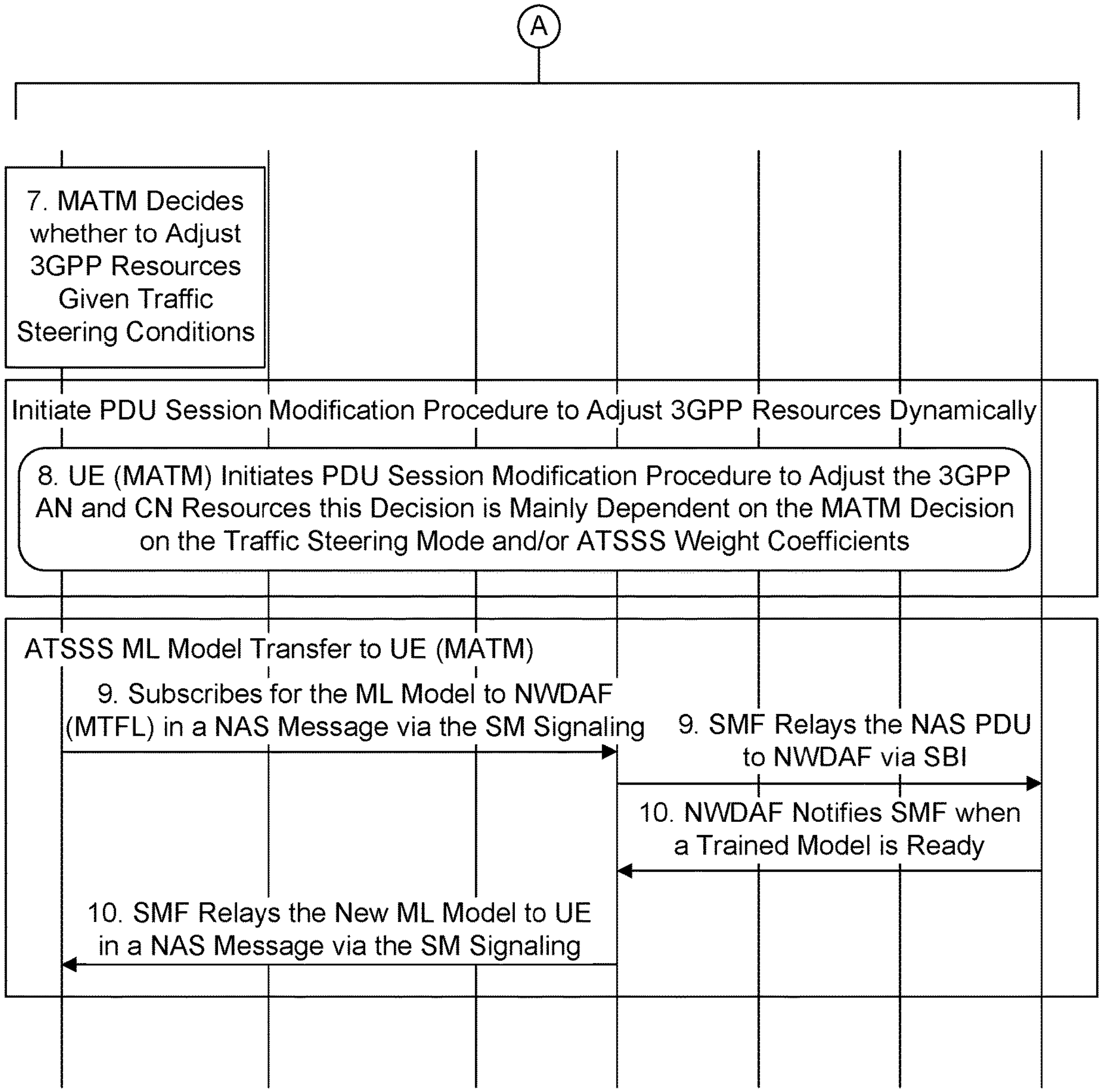

FIG. 7 is a signaling diagram illustrating interactions between a multi-access traffic manager (MATM) with other components/modules of a WTRU according to an embodiment. As shown in FIG. 7, the MATM may interacts with 5GC network functions, initially over NAS signaling with AMF/SMF, and from AMF/SMF towards its destination NF (e.g., NWDAF) through API calls (or precisely through SBIs). FIG. 7 shows an example that highlights the interactions between the MATM and other WTRU components (e.g., data providers such as the PMF, radio protocol stacks, etc.).

Referring to FIG. 7, the MATM sends a subscription request message (e.g., via EventExposure_Subscribe like service operation commonly used in some 5GC NFs) to a set of data providers to collect required data (e.g., WTRU logs, predictions, measurements, and statistics) (700-1). The WTRU is the best-positioned entity in 3GPP system to host the AI/ML components, given that a myriad of data is readily available at the WTRU. An example of a data provider at the WTRU could be the PMF, providing RTT, packet error rate and packet loss rate measurements between the WTRU and UPF. Other components in 3GS may also provide data to the MATM, such as 3rd party applications running at the WTRU or NFs in 5GC (e.g., NWDAFs and/or AFs).

To interact with 5GC, the MATM may utilize NAS signalling through the AMF/SMF. In the case of interacting with the UPF alone, the MATA may utilize the PMF connection between the WTRU and the UPF (over the user plane).

If the data provider does not support RESTful APIs, then other interfaces/APIs may be utilized by the MATM, such as sending a regular (pull) request message to collect data from a particular component/application within the WTRU. Once requested data is available at the WTRU's data provider, it may be delivered to the MATM via an event notification message (e.g., the EventExposure_Notify like service operation commonly used in 5GC).

After the MATM has received its required state inputs, it may produce its desired outcomes (700-1). It is worth highlighting that multiple instances of the MATM may be executed simultaneously in our use case. In that case, one instance may produce results regarding which ATSSS traffic steering mode should be selected for particular application traffic. The second instance may be used to suggest new weight coefficients in the case of load-balancing traffic steering mode.

When the MATM decides to switch from active-standby to load-balancing, another MATM instance may be instantiated/activated to produce a weight factor corresponding to each available access technology.

The MATM may be instantiated on different granularities. For example, it may be instantiated on a per application basis in which an instance of the MATM may be used to manage each application traffic or MA-PDU Session basis.

The ML outputs of a MATM instance suggest an ATSSS traffic steering mode for each ongoing application traffic or MA-PDU Session (700-3). Whether the steering mode is suggested for individual application flows or a PDU Session depends on the granularity at which the MATM operates.

The selected ATSSS rule assignments are delivered by the WTRU to the PCF via a NAS message (more precisely via the WTRU Policy Signalling) (700-4). The NAS container may be initially delivered to the AMF; thereafter, the NAS container may be delivered to the PCF via an API call directly. These rules may also be delivered to the UPF. In such cases, the AMF may also forward the NAS PDU received from the WTRU to the SMF via an API call. From the SMF, the NAS PDU may also be delivered to the UPF through the N4 reporting. Alternatively, the ATSSS rules may be delivered to the SMF via SM signalling (step 4*a*). Then, from SMF, it may be forwarded to both the UPF and PCF via the N4 interface and API call, respectively.

The MATM may suggest new weight coefficients in the case of load-balancing mode for both UL and DL directions (700-5). In the case of UL, the MATM may push these weights into the MPTCP kernel module at the WTRU so that traffic is split between paths/links according to the supplied weights. In the case of DL at the UPF, the MATM may first deliver these weights to the UPF, and then the UPF may decide whether to update these weights within the MPTCP kernel module.

The frequency of triggering weight updates may be set statistically or dynamically, according to network conditions, by either the WTRU or 5GC (e.g., PCF/SMF). This decision may be based on network conditions (e.g., whether the 5GC control plane has available bandwidth and/or it is highly saturated), and the WTRU's available compute resources (e.g., GPU/CPU). The latter may be useful in some situations (e.g., the WTRU may not be able to execute its ML module frequently when computational resources are limited at the WTRU, or they are not intended to be used less rapidly for the sake of energy saving). Alternatively, the WTRU may execute its ML module in a fixed time interval specified by the network or AF (particularly in the case of Federated Learning operations).

The MATM may be responsible for managing the downlink traffic at the UPF and the load-balancing traffic steering mode may also be selected (with the ML-based WTRU-aided load-balance indicator) (700-6). In that case, the weights coefficients for balancing the downlink traffic may be delivered from the WTRU to the UPF. These weights may be transported to the UPF via the user plane (via PMF) or the control plane (via NAS signalling). In the latter case, a NAS message may be utilized to transport these weights to the SMF via NAS-SM signalling (within the ATSSS container IE or a new IE). The SMF may then transport the NAS payload to the UPF with additional information provided in the NAS message. If the UPF supports SBI, the last leg of transportation may be performed via an API call. With the former case (as shown in step 6*a*), the PMF may transport this information. Transporting messages via PMF is fully secured and integrity protected because PMF traffic is carried within IPsec tunnels established during the MA-PDU Session Establishment. In this way, the UPF may also forward messages to other 5GC NFs if additional information is included in the message.

When ATSSS traffic steering mode is changed (e.g., 3GPP access becomes a backup in the case of Active-Standby), the MATM may see no benefits to keeping all 3GPP resources when it is not going to be used. As a result, the MATM may request to de-activate and remove or otherwise adjust all or some of the user-plane resources of an access network (700-7). This request may be performed because the MA-PDU Session is formed over two separate N3 tunnels, so adjusting 3GPP network resources may be performed independently of non-3GPP network resources.

The MATM may initiate the PDU Session Modification procedure and ask entities within the 3GPP system (including RAN and 5GC) to adjust their allocated resources accordingly (700-8). This adjustment may be related to the deactivation of air interface resources (e.g., SMF may interact with the NG-RAN via the N2 interface (via the Namf_Communication NIN2 Message Transfer (WTRU Specific) service Operation) and request temporary deactivation of the air interface resources for a WTRU) and/or change of network slice. The MATM may receive all information regarding the established MA-PDU Session (e.g., PDU Session Id and new QFI).

In the case the MATM wants to get a new ML model update regularly (both model construction and/or NN weights), it may subscribe to an NWDAF (MTFL) (700-9). The subscription message may be transported to NWDAF over a NAS message (i.e., over the N1 interface). Additional information may be incorporated into the ATSSS container IE or new Optional IE dedicated for this purpose to allow the SMF to subscribe to the NWDAF on behalf of the WTRU (MATM). In such scenarios, the SMF may hold a mapping between the intended Analytics Id and PDU Session Id so that when it receives a notification from the NWDAF (MTLF) it may correctly forward the notification to its consumer (i.e., the WTRU in this case).

After the NWDAF has trained its new ML model, it may notify the SMF via the Nnwdaf_EventExposure_Notify service operation. The SMF may then relay this notification to the corresponding WTRU(s) over the N1 interface via a NAS message (either within ATSSS container IE or new IE dedicated for the NN model transfer). The NAS container may include PDU Session Id, Analytics Id, Application Id, the new ML model, and/or a URI that may be used to retrieve the new ML model via user plane signalling.

The disclosures herein are described using the terms "3GPP network", "3GPP access network", "non-3GPP network" and "non-3GPP access network" convenience and simplicity of exposition. The disclosures herein may be applicable to first and second networks (e.g., access networks) other than the 3GPP network and the non-3GPP network.

Figure 8:
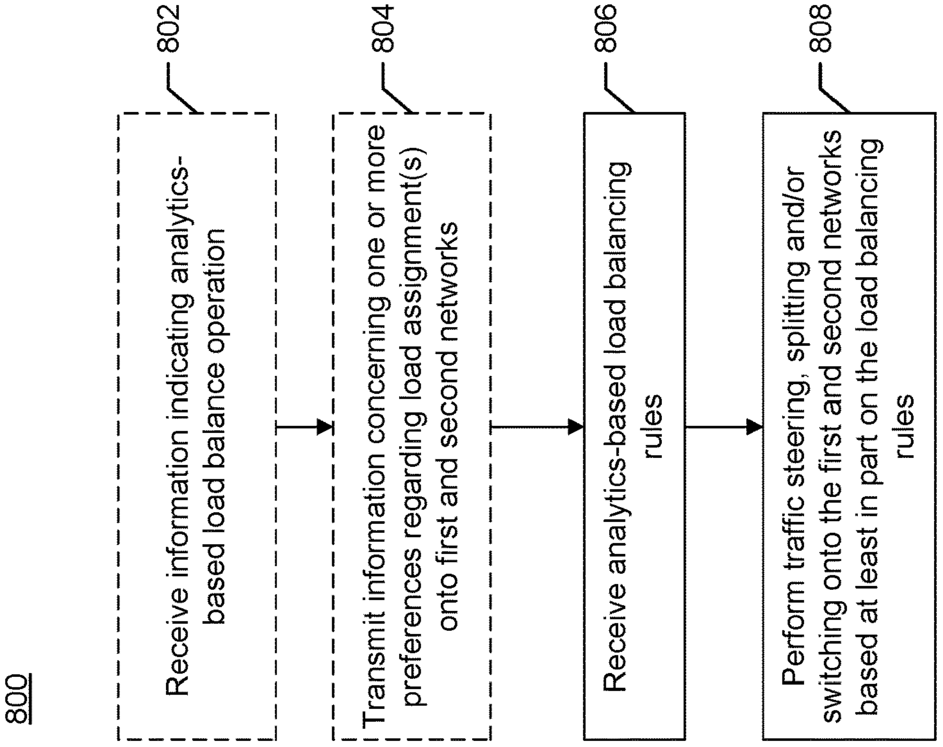
FIGS. 8-10 are flow charts illustrating example flows for carrying out analytics-based user plane optimization.

FIG. 8 is a flow chart illustrating an example flow 800 for carrying out analytics-based user plane optimization, e.g., analytics-based operation for ATSSS. The flow 800 and accompanying disclosures herein may be considered a generalization of at least some of the disclosures accompanying FIGS. 4-6, and are considered to encompass and/or include various embodiments of the disclosures above, including, for example, the disclosures accompanying FIGS. 4-6. The flow 800 may be carried out using the architecture of the communications system 100 of FIGS. 1A-1D. The flow 800 may be carried out using other architectures as well.

Referring to FIG. 8, a WTRU may receive, from a network, one or more load balancing rules, e.g., one or more analytics-based load balancing rules (806) and/or may steer traffic onto first and second networks based at least in part on the load balancing rules (808). In various embodiments, load balancing rules may be based on any of one or more performance measurements, one or more operator preferences regarding load assignment onto the first and second networks, and one or more WTRU preferences regarding the load assignment onto the first and second networks.

In various embodiments, the WTRU may receive, from the network, information indicating (e.g., an indication of) analytics-aided (and/or based) load balance operation (802). In various embodiments, the WTRU may transmit to the network (e.g., in response to the information/indication), information concerning the one or more WTRU preferences regarding the load assignment onto the first and second networks (804).

In various embodiments, the load balancing rules may include one or more load balancing weight factors. In various embodiments, the load balancing weight factors may be based on any of the performance measurements, the operator preferences, and the WTRU preferences.

In various embodiments, the WTRU may receive the load balancing rules from an NWDAF. In various embodiments, the NWDAF may provide the load balancing rules to the WTRU and to a UPF. In various embodiments, both of the WTRU and UPF may receive the load balancing rules. The NWDAF may provide the load balancing rules via an SMF.

In various embodiments, the load balancing rules may be any of predictive and proactive. In various embodiments, the load balancing rules may include MATM rules. In various embodiments, the MATM rules may, and/or may be used to, configure the WTRU to adjust (e.g., dynamically adjust) one or more load balancing weight factors in a load balancing traffic steering mode of operation. In various embodiments, the MATM rules may, and/or may be used to, configure (e.g., further configure) the WTRU to switch (e.g., dynamically switch) between traffic steering modes of operation.

In various embodiments, the WTRU may implement the MATM rules as a ML component having a NN model (not shown). In various embodiments, the WTRU may train (e.g., dynamically train) and/or update (e.g., dynamically train) the NN model. In various embodiments, the WTRU may train (e.g., dynamically train) and/or update (e.g., dynamically update) the NN model according to one or more conditions of, and/or associated with, the WTRU. In various embodiments, the conditions of, and/or associated with, the WTRU may include any of a traffic pattern, mobility, available capacity and the like.

In various embodiments, the first network may be and/or may include a first access network. In various embodiments, the second network may be and/or may include a second access network. In various embodiments, the first network may be and/or may include a 3GPP network. In various embodiments, the second network may be and/or may include a non-3GPP network. In various embodiments, the 3GPP network may be and/or may include a 3GPP access network. In various embodiments, the non-3GPP network may be and/or may include a non-3GPP access network.

Figure 9:
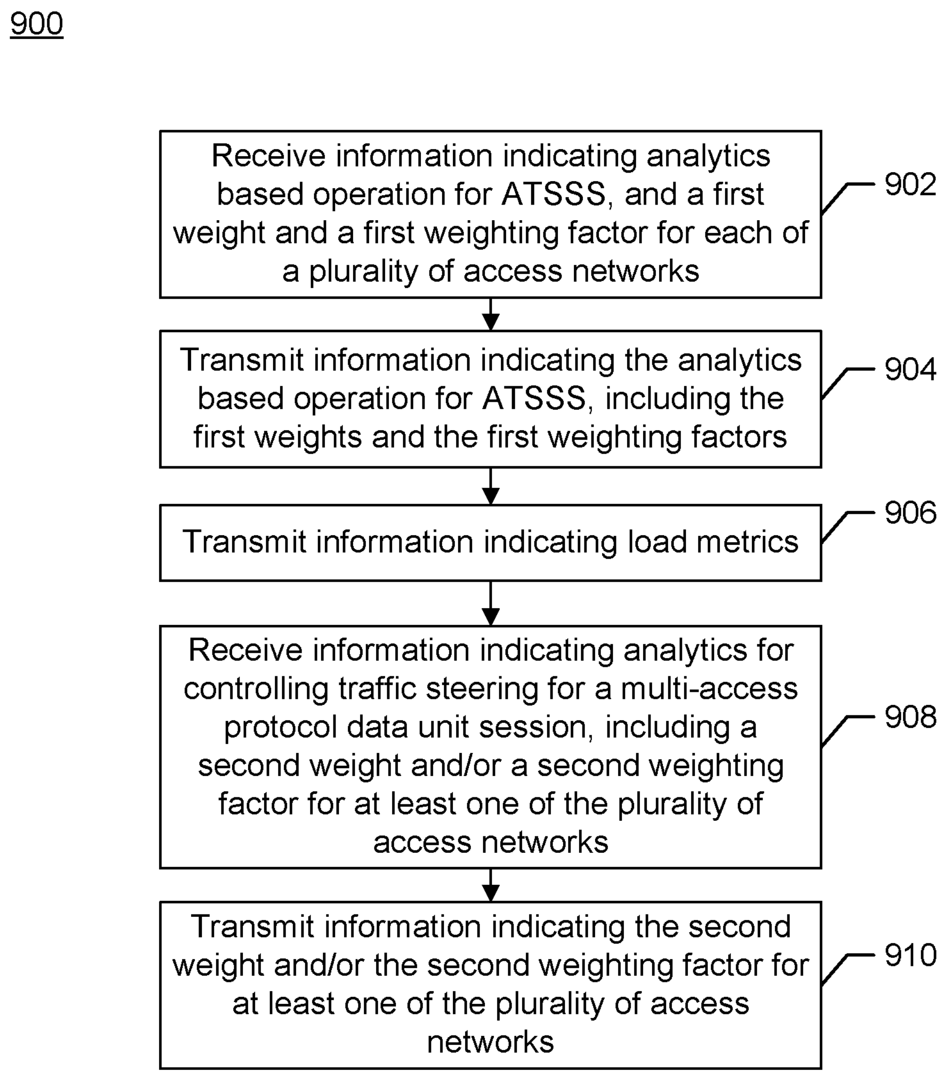

FIG. 9 is a flow chart illustrating an example flow 900 for carrying out analytics-based user plane optimization, e.g., analytics-based operation for ATSSS. The flow 900 and accompanying disclosures herein may be considered a generalization of at least some of the disclosures accompanying FIGS. 4-6, and are considered to encompass and/or include various embodiments of the disclosures above, including, for example, the disclosures accompanying FIGS. 4-6. The flow 900 may be carried out using the architecture of the communications system 100 of FIGS. 1A-1D. The flow 900 may be carried out using other architectures as well.

Referring to FIG. 9, a first network entity may receive first information indicating (i) analytics-based operation for ATSSS, (ii) a first weight for each of a plurality of access networks, and (iii) at least one first weighting factor for each of the plurality of access networks (902). In various embodiments, the first network entity may receive the first information from a second network entity. In various embodiments, the second network entity may be and/or may include a PCF. In various embodiments, the first network entity may be and/or may include an SMF. In various embodiments, the analytics-based operation may be and/or may include an analytics-based load balance operation for the ATSSS.

The first network entity may transmit second information indicating the analytics-based operation for ATSSS, including the first weights and the first weighting factors (904). In various embodiments, the first network entity may transmit the second information to a third network entity. In various embodiments, the third network entity may be and/or may include a UPF.

The first network entity may transmit to a fourth network entity third information indicating one or more load metrics (906). In various embodiments, the first network entity may transmit the third information to a fourth network entity. In various embodiments, the third network entity may be and/or may include an NWDAF. In various embodiments, the load metrics may be based on the first weights and the first weighting factors.

The first network entity may receive fourth information indicating analytics for controlling traffic steering for a multi-access protocol data unit session, including one or more of (i) a second weight for at least one access network of the plurality of access networks and (ii) a second weighting factor for at least one access network of the plurality of access networks (908). In various embodiments, the first network entity may receive the fourth information from the fourth network entity. In various embodiments, the analytics may be based on any of (a) the third information transmitted to the fourth network entity; and (b) fifth information, from the third network entity, indicating criteria for partitioning downlink traffic among the plurality of access networks.

The first network entity may transmit sixth information indicating the second weight and/or the second weighting factor for at least one of the plurality of access networks (910). In various embodiments, the first network entity may transmit the sixth information to at least one of the third network entity and a WTRU. The sixth information may be transmitted to the third network entity and the WTRU according to the same protocol and/or as one or more rules. Alternatively, the sixth information may be transmitted to the third network entity according to a first protocol, e.g., N4, and/or as one or more rules, e.g., one or more N4 rules. Alternatively, and/or additionally, the sixth information may be transmitted to the WTRU according to a second protocol, e.g., ATSSS, and/or as one or more rules, e.g., one or more ATSSS rules.

The first network entity may transmit, to the WTRU, seventh information indicating the analytics-based operation for ATSSS (not shown). In various embodiments, the analytics may be based on (e.g., further based on) eighth information, from the WTRU, indicating one or more criteria for partitioning uplink traffic among the plurality of access networks. In various embodiments, the first network entity may receive the eighth information from the WTRU (not shown).

In various embodiments, the analytics may be based on (e.g., further based on) a prediction for a time at which steering is to be deployed. In various embodiments, the analytics may be based on (e.g., further based on) ninth information indicating one or more behaviors of the WTRU (e.g., one or more expected behaviors of the WTRU). In various embodiments, the first network entity may receive the ninth information from a fifth network entity. In various embodiments, the fifth network entity may be and/or may include an AMF. In various embodiments, the analytics may be any of predictive and proactive.

In various embodiments, the second weight may be and/or may include a revised version of one of the first weights. In various embodiments, the second weighting factor may be and/or may include a revised version of one the first weighting factors. In various embodiments, any of the second weight and the second weighting factor may be based on any of one or more performance measurements, one or more operator preferences, and one or more preferences of the WTRU. In various embodiments, the first network entity may receive the performance measurements from an operations administration and management entity. In various embodiments, the first network entity may receive the operator preferences from the second network entity.

Figure 10:
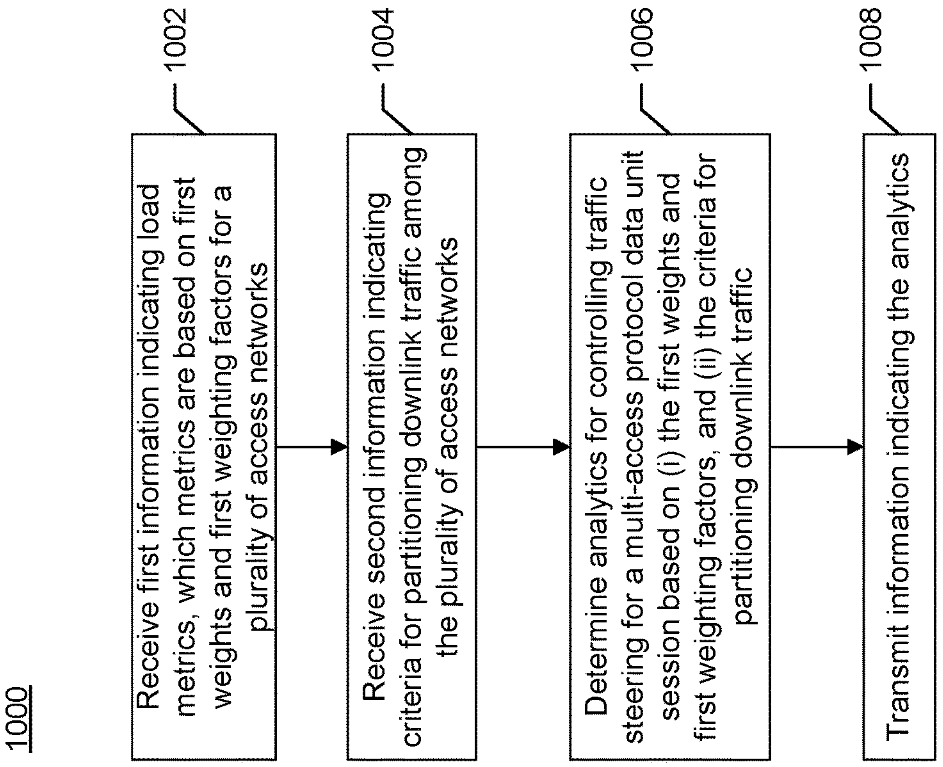

FIG. 10 is a flow chart illustrating an example flow 1000 for carrying out analytics-based user plane optimization, e.g., analytics-based operation for ATSSS. The flow 1000 and accompanying disclosures herein may be considered a generalization of at least the disclosures accompanying FIGS. 4-6, and are considered to encompass and/or include various embodiments of the disclosures above, including, for example, the disclosures accompanying FIGS. 4-6. The flow 1000 may be carried out using the architecture of the communications system 100 of FIGS. 1A-1D. The flow 1000 may be carried out using other architectures as well.

Referring to FIG. 10, a first network entity may receive first information indicating one or more load metrics, which load metrics may be based on first weights and first weighting factors for a plurality of access networks (1002). For example, the load metrics may be based on (i) a first weight for each of the plurality of access networks, and (ii) at least one first weighting factor for each of the plurality of access networks. In various embodiments, the first network entity may receive the first information from at least one of a second network entity and a WTRU. In various embodiments, the second network entity may be and/or may include a UPF. In various embodiments, the first network entity may receive at least some of the first information from the WTRU via at least one of the second network entity and a third network entity. In various embodiments, the first network entity may receive at least some of the first information from the second network entity and via the third network entity. In various embodiments, the third network entity may be and/or may include an SMF. In various embodiments, the first network entity may be and/or may include a NWDAF.

The first network entity may receive second information indicating criteria for partitioning downlink traffic among the plurality of access networks (1004). In various embodiments, first network entity may receive the second information from and/or via the second network entity. In various embodiments, first network entity may receive the second information from and/or via the second network entity and via the third network entity.

The first network entity may derive or otherwise determine analytics for controlling traffic steering for a multi-access protocol data unit session, wherein the analytics may be determined based on the one or more load metrics and/or the criteria for partitioning downlink traffic among the plurality of access networks (1006). The analytics may be and/or may include one or more of (i) a second weight for at least one access network of the plurality of access networks and (ii) a second weighting factor for at least one access network of the plurality of access networks. The first network entity may transmit third information indicating the analytics (1008). In various embodiments, the first network entity may transmit the third information to a third network entity. In various embodiments, the third network entity may be and/or may include an SMF.

In various embodiments, the analytics may be based on a prediction for a time at which steering is to be deployed. In various embodiments, the analytics may be based at least in part on ninth information indicating (e.g., expected) behavior of the WTRU. In various embodiments, the first network entity may receive the information indicating the behavior of the WTRU from a fourth network entity. In various embodiments, the fourth network entity may be and/or may include an AMF. In various embodiments, the analytics may be any of predictive and proactive.

In various embodiments, the second weight may be and/or may include a revised version of one of the first weights. In various embodiments, the second weighting factor may be and/or may include a revised version of one the first weighting factors. In various embodiments, any of the second weight and the second weighting factor may be based on any of one or more performance measurements, one or more operator preferences, and one or more preferences of the WTRU. In various embodiments, the first network entity may receive the performance measurements from an operations administration and management entity. In various embodiments, the first network entity may receive the operator preferences from the third network entity.

REFERENCES

The following references may have been referred to hereinabove and are incorporated in full herein by reference.

[1] 3GPP TR 23.793 "Study on Access Traffic Steering, Switch and Splitting Support in the 5G System Architecture (Release 16)".

[2] 3GPP TR 23.700-93 "Study on access traffic steering, switch and splitting support in the 5G System (5GS) architecture; Phase 2 (Release 17)".

[3] 3GPP SP-211612 "Study on Access Traffic Steering, Switching and Splitting support in the 5G system architecture; Phase 3 (Release 18)".

[4] 3GPP TR 23.700-91 "Study on enablers for network automation for the 5G System (5GS); Phase 2 (Release 17)".

[5] 3GPP SP-211652 "New SID on Study on UPF enhancement for Exposure and SBA (Release 18)".
[6] 3GPP SP-211650 "Study on Enablers for Network Automation for 5G-Phase 3 (Release 18)".
[7] 3GPP TR 22.874 "Study on traffic characteristics and performance requirements for AI/ML model transfer (Release 18)".
[8] 3GPP SP-211328 "Study on 5G System Support for AI/ML-based Services (Release 18)".
[9] 3GPP SP-211568 "Study on enhanced support of Non-Public Networks phase 2 (Release 18)".
[10] 3GPP TS 23.288 "Architecture enhancements for 5G System (5GS) to support network data analytics services (Release 17)".
[12] Salim, J., Khosravi, H., Kleen, A. and Kuznetsov, A., 2003. RFC3549: Linux netlink as an IP services protocol.
[13] V. Mnih, A. P. Badia, M. Mirza, A. Graves, T. Lillicrap, and et al., "Asynchronous methods for deep reinforcement learning," in ICML '16.
[14] T. P. Lillicrap, J. J. Hunt, A. Pritzel, and et al., "Continuous control with deep reinforcement learning," arXiv preprint arXiv: 1509.02971, 2015.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, MME, EPC, AMF, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, 16 or means-plus-function claim format, and any claim without the terms "means for" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the various embodiments have been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented in a first network entity, the method comprising:

receiving, from a second network entity, first information indicating (i) analytics-aided load-balance operation for access traffic steering, splitting and switching, (ii) a first weight for each of a plurality of access networks, and (iii) at least one first weighting factor for each of the plurality of access networks;

transmitting, to a third network entity, second information indicating (i) the analytics-aided load-balance for access traffic steering, splitting and switching, (ii) the first weights, and (iii) the first weighting factors;

transmitting, to a fourth network entity, third information indicating one or more load metrics, wherein the one or more load metrics are based on the first weights and the first weighting factors;

receiving, from the fourth network entity, fourth information indicating analytics for controlling traffic steering for a multi-access protocol data unit session, including one or more of (i) a second weight for at least one access network of the plurality of access networks and (ii) a second weighting factor for at least one access network of the plurality of access networks, wherein the analytics are based on:

(a) the third information transmitted to the fourth network entity, and (b) fifth information, from the third network entity, indicating criteria for partitioning downlink traffic among the plurality of access networks; and transmitting, to at least one of the third network entity and a wireless transmit/receive unit, WTRU, sixth information indicating the one or more of (i) the second weight and (ii) the second weighting factor.

2. The method of claim 1, further comprising:

transmitting, to the WTRU, seventh information indicating the analytics-aided load-balance operation for access traffic steering, splitting and switching, wherein the analytics are further based on eighth information, from the WTRU, indicating one or more criteria for partitioning uplink traffic among the plurality of access networks.

3. The method of claim 2, wherein the first information is an access traffic steering, splitting and switching policy, and wherein the seventh information is an access traffic steering, splitting and switching rule which includes a steering mode indicator indicating the analytics-aided load-balance operation.

4. The method of claim 1, wherein the second information is an N4 rule, associated with the downlink traffic, which includes a steering mode indicator indicating the analytics-aided load-balance operation.

5. The method of claim 1, wherein the third information is session reporting information that includes an access load report including the one or more load metrics.

6. The method of claim 1, wherein the fourth information is multi-access traffic steering control analytics information.

7. The method of claim 1, wherein the sixth information is transmitted to the third network entity and is an N4 rule, associated with the downlink traffic, which includes a steering mode indicator indicating the analytics-aided load-balance operation, and wherein the second weight comprises a revised version of one of the first weights, and wherein the second weighting factor comprises a revised version of one the first weighting factors.

8. The method of claim 1, wherein the sixth information transmitted to the WTRU is an access traffic steering, splitting and switching rule, associated with uplink traffic, which includes a steering mode indicator indicating the analytics-aided load-balance operation, and wherein the second weight comprises a revised version of one of the first weights, and wherein the second weighting factor comprises a revised version of one the first weighting factors.

9. The method of claim 1, wherein the analytics are further based on information indicating any of expected behavior of the WTRU, one or more operator preferences, and one or more preferences of the WTRU.

10. The method of claim 1, wherein at least one of:

the first network entity comprises a session management function;

the second network entity comprises a policy control function;

the third network entity comprises a user plane function; and the fourth network entity comprises a network data analytics function.

11. A first network entity comprising:

a processor, memory, and a transceiver which are configured to:

receive, from a second network entity, first information indicating (i) analytics-aided load-balance operation for access traffic steering, splitting and switching, (ii) a first weight for each of a plurality of access networks, and (iii) at least one first weighting factor for each of the plurality of access network, transmit, to a third network entity, second information indicating (i) the analytics-aided load-balance operation for access traffic steering, splitting and switching, (ii) the first weights, and (iii) the first weighting factors, transmit, to a fourth network entity, third information indicating one or more load metrics, wherein the one or more load metrics are based on the first weights and the first weighting factors, receive, from the fourth network entity, fourth information indicating analytics for controlling traffic steering for a multi-access protocol data unit session, including one or more of (i) a second weight for at least one access network of the plurality of access networks and (ii) a second weighting factor for at least one access network of the plurality of access networks, wherein the analytics are based on:

(a) the third information transmitted to the fourth network entity, and (b) fifth information, from the third network entity, indicating criteria for partitioning downlink traffic among the plurality of access networks; and transmit, to at least one of the third network entity and a wireless transmit/receive unit, WTRU, sixth information indicating the one or more of (i) the second weight and (ii) the second weighting factor.

12. The first network entity of claim 11, wherein the processor, memory, and transceiver are configured to:

transmit, to the WTRU, seventh information indicating the analytics-aided load-balance operation for access traffic steering, splitting and switching, wherein the analytics are further based on eighth information, from the WTRU, indicating one or more criteria for partitioning uplink traffic among the plurality of access networks.

13. The first network entity of claim 12, wherein the first information is an access traffic steering, splitting and switching policy, and wherein the seventh information is an access traffic steering, splitting and switching rule which includes a steering mode indicator indicating the analytics-aided load-balance operation.

14. The first network entity of claim 11, wherein the second information is an N4 rule, associated with the downlink traffic, which includes a steering mode indicator indicating the analytics-aided load-balance operation.

15. The first network entity of claim 11, wherein the third information is session reporting information that includes an access load report including the one or more load metrics.

16. The first network entity of claim 11, wherein the fourth information is multi-access traffic steering control analytics information.

17. The first network entity of claim 11, wherein the sixth information is transmitted to the third network entity and is an N4 rule, associated with the downlink traffic, which includes a steering mode indicator indicating the analytics-aided load-balance operation, and wherein the second weight comprises a revised version of one of the first weights, and wherein the second weighting factor comprises a revised version of one the first weighting factors.

18. The first network entity of claim 11, wherein the sixth information transmitted to the WTRU is an access traffic steering, splitting and switching rule, associated with uplink traffic, which includes a steering mode indicator indicating the analytics-aided load-balance operation, and wherein the second weight comprises a revised version of one of the first weights, and wherein the second weighting factor comprises a revised version of one the first weighting factors.

19. The first network entity of claim 12, wherein the analytics are further based on information indicating any of expected behavior of the WTRU, one or more operator preferences, and one or more preferences of the WTRU.

20. The first network entity of claim 12, wherein at least one of:

the first network entity comprises a session management function;

the second network entity comprises a policy control function;

the third network entity comprises a user plane function; and the fourth network entity comprises a network data analytics function.

* * * * *